United States Patent
Clay

(10) Patent No.: US 10,155,598 B2
(45) Date of Patent: *Dec. 18, 2018

(54) COMMERCIALLY FEASIBLE METHOD OF FLYING REPEATED ORBITAL MISSIONS USING A SPACE VEHICLE

(71) Applicant: Joseph Michael Clay, Houston, TX (US)

(72) Inventor: Joseph Michael Clay, Houston, TX (US)

(73) Assignee: Spacedesign Corporation, Houston, TX (US)

( * ) Notice: Subject to any disclaimer, the term of this patent is extended or adjusted under 35 U.S.C. 154(b) by 753 days.

This patent is subject to a terminal disclaimer.

(21) Appl. No.: 13/669,395

(22) Filed: Nov. 5, 2012

(65) Prior Publication Data

US 2014/0124627 A1    May 8, 2014

Related U.S. Application Data

(60) Provisional application No. 61/556,209, filed on Nov. 5, 2011.

(51) Int. Cl.
| | |
|---|---|
| *B64G 1/12* | (2006.01) |
| *B64G 1/60* | (2006.01) |
| *G06Q 10/02* | (2012.01) |
| *B64G 1/14* | (2006.01) |
| *B64G 1/50* | (2006.01) |

(52) U.S. Cl.
CPC ............... *B64G 1/14* (2013.01); *B64G 1/12* (2013.01); *B64G 1/60* (2013.01); *G06Q 10/02* (2013.01); *B64G 1/50* (2013.01)

(58) Field of Classification Search
CPC ...... G06Q 10/02; G06Q 10/025; G06Q 50/14; B64G 1/12; B64G 1/14; B64G 1/60
See application file for complete search history.

(56) References Cited

U.S. PATENT DOCUMENTS

| | | | |
|---|---|---|---|
| 2,586,333 A | 2/1952 | Hoffmeister | |
| 3,157,192 A | 11/1964 | Hafstrom et al. | |
| 3,281,964 A | 11/1966 | Hewes | |
| 3,295,223 A | 1/1967 | Zeff et al. | |
| 3,993,164 A | 11/1976 | Brown | |
| 4,643,375 A * | 2/1987 | Allen | B64G 1/60 244/171.9 |
| 4,867,395 A | 9/1989 | Taylor et al. | |
| 5,042,753 A | 8/1991 | Atlas | |
| 5,302,130 A | 4/1994 | Sieving | |
| 6,206,328 B1 | 3/2001 | Taylor | |
| 6,216,984 B1 * | 4/2001 | Brinsmade | B64G 1/12 244/159.4 |
| 7,513,457 B2 | 4/2009 | Schalla et al. | |

(Continued)

FOREIGN PATENT DOCUMENTS

GB    2318338 A    4/1998

OTHER PUBLICATIONS

David, et al., The Space Tourist, AAS 85 771-774, Proceedings of the Fourth Annual L5 Space Development Conference, Apr. 1985.*

(Continued)

*Primary Examiner* — Daniel Vetter

(57) ABSTRACT

The application provides a commercially feasible method of flying repeated orbital missions using a Space Shuttle Program (SSP) Orbital Vehicle.

41 Claims, 18 Drawing Sheets

(56) References Cited

U.S. PATENT DOCUMENTS

| | | | |
|---|---|---|---|
| 7,769,612 B1* | 8/2010 | Walker et al. | 705/7.11 |
| 9,090,361 B2 | 7/2015 | Clay | |
| 2002/0074457 A1 | 6/2002 | Barutt | |
| 2002/0189360 A1 | 12/2002 | Kawasaki | |
| 2004/0176970 A1* | 9/2004 | Paluszek et al. | 705/1 |
| 2006/0163434 A1* | 7/2006 | Patel | B64G 1/10 244/158.3 |
| 2007/0128582 A1* | 6/2007 | Anderson et al. | 705/5 |
| 2009/0075740 A1 | 3/2009 | Kojro | |
| 2009/0166371 A1 | 7/2009 | Dikken | |
| 2009/0319305 A1* | 12/2009 | Weissert et al. | 705/5 |
| 2014/0124626 A1 | 5/2014 | Clay | |
| 2016/0376038 A1 | 12/2016 | Clay | |

OTHER PUBLICATIONS

NASA, Space Sleep, Aug. 2003, available at http://www.spaceflight.nasa.gov/living/spacesleep/index.html.*

Matsumoto, et al., Feasibility of Space Tourism "Cost Study for Space Tour", Proceedings of 40th IAF Congress, IAF paper No. IAF-89-700, 1989.*

O'Neil, et al., General Public Space Travel and Tourism—vol. 1 Executive Summary, NASA Marshall Space Flight Center, NP-1998-3-11-MSFC, Mar. 1998.*

Collins, et al., Potential Economic Implications of the Development of Space Tourism, Proceedings of 37th IAF Congress, IAF Paper No. IAA-86-446, Oct. 1986.*

NASA FY 2009 Budget Request Summary.*

Spacedesign Asteroid Initiative RFI Response (Jul. 11, 2013)[11 pages][Proprietary].

Collaborations for Commercial Space Capabilities—Proposal A (May 28, 2014)[19 pages].

Asteroid Redirect Mission—BA NNH14ZC!002K Study of Potential Future Partnership (May 5, 2014)[18 pages].

Commercial Space Shuttle Spaceline Budget Estimate and Market Survey (Mar. 19, 2008)[12 pages][Proprietary].

Presentation made by Joe Clay at NASA Headquarters in Washington, D.C. on Nov. 5, 2010, entitled "The Human Exploration Mission" (THEM), redacted (28 pages).

"Space Shuttle", http://en.wikipedia.org/wiki/Space_Shuttle, original published by Nov. 5, 2012 (18 pages).

Carl F. Ehrlich, Jr, et al. "Shuttle Variations and Derivatives That Never Happened—An Historical Review," paper presented at the 2004 Joint Propulsion Conference, Ft. Lauderdale, FL (11 pages).

L. David, R. Citron, T. Rogers & C.D. Walker, Apr. 25-28, 1985, "The Space Tourist" AAS 85-771-774. Proceedings of the Fourth Annual L5 Space Development Conference held Apr. 25-29, 1985, in Washington, D.C. Accessed by examiner in U.S. Appl. No. 13/669,385 from http://www.spacefuture.com/archive/the_space_tourist.shtml on May 2, 2014, (28 pages).

NASA, "Space Shuttle Reference Manual," updated Apr. 7, 2002. Accessed by examiner in U.S. Appl. No. 13/669,385 from http://spaceflight.nasa.gov/shuttle/reference/shutref/verboseindex.html on May 6, 2014 (36 pages).

B. Citron, "The Early History of SPACEHAB: 1983 to 1987," Jul. 2007. Accessed by examiner in U.S. Appl. No. 13/669,385 from http://www.astrotechcorp.com/files/atec/history/spab_history_book.pdf on May 2, 2014 (45 pages).

C. Ehrlich and J. Martin, "Shuttle Variations and Derivatives That Never Happened—An Historical Review," AIAA 2004-3734 Presented at the 40$^{th}$ AIAA/ASME/SAE/ASEE Joint Propulsion Conference and Exhibit, Jul. 11-14, 2004, Ft. Lauderdale, Fl. Accessed by the examiner in U.S. Appl. No. 13/669,385 at https://www.aiaa.org/uploadedfiles/about-aiaa/history_and_heritage/final_space_shuttle_launches/shuttlevarationsfinalaiaa.pdf and http://arc.aiaa.org/doi/abs/10.2514/6.2004-3734?prevSearch=$searchHistoryKey on May 2, 2014 (11 pages).

NASA, "Space Shuttle Reference Manual—Crew Compartment," updated Apr. 7, 2002. Accessed by examiner in U.S. Appl. No. 13/669,385 from http://spaceflight.nasa.gov/shuttle/reference/shutref/structure/crew.html on Oct. 18, 2014 (3 pages).

Gilles Cement, Angie Bukley, William Paloski, "History of Artificial Gravity" (Chapter 3), Jan. 1, 2006. Accessed by examiner in U.S. Appl. No. 13/669,385 from http://download.springer.com/static/pdf/202/chp%253A10.1007%252F0-387-70714-X_3.pdf?auth66=1413827527_b383b36faf89f27e97907b648c834df8&ext=.pdf on Oct. 18, 2014 (35 pages).

Clement "History of Artificial Gravity" citation in NASA Technical Reports Server (NTRS). Accessed by examiner in U.S. Appl. No. 13/669,385 by examiner in U.S. Appl. No. 13/669,385 by examiner in U.S. Appl. No. 13/669,385 from http://ntrs.nasa.gov/search.jps?R=20070001098&hterms=artificial+gravity+spin&gs=N%3D0%26Ntk%3DAll%26Ntt%3Dartificial%2520gravity%2520spin%26Ntx%3Dmode%2520matchall on Oct. 20, 2014 (1 page).

Ralph W. Stone Jr. and William M. Piland, "Potential Problems Related to Weightlessness and Artificial Gravity," NASA TN D-4980, Jan. 1969. Accessed by examiner in U.S. Appl. No. 13/669,385 from http//ntrs.nasa.gov/archive/nasa/casi.ntrs.nasa.gov/19690006297.pdf on Oct. 20, 2014 (63 pages).

Dennis Eskow, "Space Vacation 1995" in Popular Mechanics, Nov. 1985, pp. 69, 62, and 168. Accessed by examiner in U.S. Appl. No. 13/669,385 from http://books.google.com/books?id=_.MDAAAAMBAJ&pg=PA59&lpg=PA59&dq=space+vacation+1995+popular+mechanics&source=bl&ots=u5V3pcS8Bw&sig=E1-V9TuO9PVXMmpFIV9FEaSjpio&hl=en &sa=X&ei=3XxFVP-eMfeUsQGroClAw&ved=OCCAQ6AEwAA#v=onepage&q=space%20vacation%201995%20popular%20mechanics&f=false on Oct. 18, 2014 (3 pages, best available copy).

Presentation made by Joe Clay at NASA Headquarters in Washington, D.C. on Nov. 6, 2010 entitled "The Human Exploration Mission" (THEM), redacted (26 pages).

"Space Shuttle", http://en.wikipedia.org/wiki/SpaceShuttle, original published by Nov. 5, 2012 (21 pages).

NSTS 07700 vol. 1, Revision G, Dec. 17, 1997, Space Shuttle, Program Description and Requirements Baseline, Program Definition and Requirements, vol. I; change sheets; i-viii; 1-1 through 1-2; 2-1 through 2-8; 3-1 through 3-19; 4-1 through 4-6; 5-1 through 5-10 (57 pages).

Shuttle Orbiter/Cargo Standard Interfaces (CORE), ICD 2-19001, Revision L, Jan. 21, 2010, pt. 1, i-xxi; 3A-1 through 3A-47; 3B-1 through 3B-4(72 pages).

Shuttle Orbiter/Cargo Standard Interfaces (CORE), ICD 2-19001, Revision L, Jan. 21, 2010, pt. 2, 3B-5; 3C-1 through 3C-28; 3D-1 through 3D-7; 3E-1 through 3E-14; 3F-1 through 3F-17; 3G-1 through 3G-4 (71 pages).

Shuttle Orbiter/Cargo Standard Interfaces (CORE), ICD 2-19001, Revision L, Jan. 21, 2010, pt. 3, 3G-5 through 3G-10; 3H-1 through 3H-41(47 pages).

Press Release, Jan. 31, 2011, entitled Paragon Space Development Corporation Completes All Development Milestones on the NASA Crew Development Program (2 pages).

Shuttle Orbiter/Cargo Standard Interfaces (CORE), ICD 2-19001, Jan. 15, 1998; 8H-10; 10B-1 through 10B-46 (47 pages).

R. C. Hibbeler, *Engineering Mechanics Dynamics* (5$^{th}$ Ed. 1989) cover and copyright pages, pp. 194-196, 198-200 (8 pages).

R. C. Hibbeler, *Engineering Mechanics Dynamics* (5$^{th}$ Ed. 1989) cover and copyright pages, pp. 236-240 (7 pages).

Passenger Bay Proposal, Spacedesign Corporation (Spaceline, DBA), Commercial Crew Development Round 2, NASA-CCDEV-2 (Dec. 13, 2010) (22 pages, Proprietary).

Brochure entitled Spaceline, Space Flight Participant Travel Tickets Destination—International Space Station Departures Beginning 2020, showed to employee of Goddard Space Flight Center (Sep. 1, 2015) (12 pages, Proprietary).

Collaborations for Commercial Space Capabilities—Proposal A: Asteroid Deflection Capability Stage 1 Part A, discussed with employee of Goddard (Aug. 5, 2015) (19 pages).

Collaborations for Commercial Space Capabilities—Proposal A: Asteroid Deflection Capability Stage 1 Part A (Mar. 23, 2012) (50 pages).

(56) References Cited

OTHER PUBLICATIONS

Letter to NASA Goddard Space Flight Center, Innovation Partnerships Program Office (Dec. 20, 2013 (6 pages).

* cited by examiner

| System | Component | Item Weight (lbs.) | Count | Weight (lbs.) |
|---|---|---|---|---|
| Structure and Pressure vessel | | | | |
| | Al-Li Panels | 1346.95 | 10 | 13469.5 |
| | Al-Li End cap | 1131.275 | 2 | 2262.55 |
| | Al I-beams | 211.05 | 4 | 844.2 |
| | Vertical I-beams | 75.04 | 4 | 300.16 |
| | Ti Longeron bracket | 450 | 4 | 1800 |
| | Ti Keel trunnion | 50 | 2 | 100 |
| | Beta Cloth | 100 | 11 | 1100 |
| | ODS Door | 250 | 1 | 250 |
| | Insulation | 100 | 11 | 1100 |
| | Bulkheads | 502.79 | 3 | 1508.37 |
| | Lav bulkhead | 754.18 | 1 | 754.18 |
| Compartment 1- Above deck | | | | |
| | Floor panels | 376.65 | 9 | 3389.85 |
| | Seats | 65 | 44 | 2860 |
| | Ducting | 110 | 9 | 990 |
| Compartment 2- Below deck | | | | |
| | Batteries | 100 | 5 | 500 |
| | ECLSS | 140 | 8 | 1120 |
| | Ducting | 110 | 4 | 440 |
| | Gallery | 500 | 1 | 500 |
| Compartment 3- Lavatories | | | | |
| | Relavator | 600 | 1 | 600 |
| | Lavatory | 1200 | 1 | 1200 |
| | Counter Weight | 800 | 1 | 800 |
| | Electric motors | 50 | 3 | 150 |
| Compartment 4- Sleeper Cabins | | | | |
| | Cabins | 150 | 5 | 750 |
| Dry Mass | | | | 36788.81 |
| Passengers | | 250 | 44 | 11000 |
| Water | | 1100 | 1 | 1100 |
| Total Weight | | | | 48888.81 |

*FIG. 13*

NASA FY09 BUDGET ESTIMATE

| SPACE SHUTTLE ($ millions) | FY 2008 | FY 2009 | FY 2010 | YEARLY AVERAGE |
|---|---|---|---|---|
| FLIGHT AND GROUND OPERATIONS | | | | |
| Launch and Landing (KSC) | 780.4 | 705.5 | 632.5 | 706.1 |
| Landing Operations (DFRC) | 3.1 | 4.0 | 4.0 | 3.7 |
| Mission Operations | 236.5 | 221.4 | 220.8 | 226.2 |
| Flight Crew Operations | 87.6 | 86.3 | 83.0 | 85.6 |
| Space and Life Sciences | 12.6 | 12.1 | 13.1 | 12.6 |
| Total | 1120.06 | 1029.3 | 953.4 | 1034.2 |
| FLIGHT HARDWARE | | | | |
| Orbiter | 504.8 | 459.1 | 638.4 | 534.1 |
| EVA | 0.2 | 0.2 | 0.2 | 0.2 |
| External Tank | 313.2 | 253.6 | 169.2 | 245.3 |
| Reusable Solid Rocket Motors | 369.0 | 301.6 | 114.9 | 261.8 |
| Space Shuttle Main Engine | 240.0 | 193.8 | 178.0 | 203.9 |
| Solid Rocket Boosters | 154.1 | 136.8 | 98.2 | 129.7 |
| SSC Test Support | 33.2 | 30.0 | 24.7 | 29.3 |
| Total | 1614.5 | 1375.1 | 1223.6 | 1404.3 |
| PROGRAM INTEGRATION | | | | |
| Systems Engineering and Integration | 86.7 | 74.0 | 77.4 | 79.4 |
| Safety and Mission Assurance | 30.6 | 54.8 | 42.2 | 42.5 |
| Flight Software | 112.4 | 100.9 | 107.4 | 106.9 |
| Flight Operations and Integration | 52.2 | 54.8 | 55.0 | 54.0 |
| Management Integration and Planning | 31.1 | 26.7 | 26.7 | 28.2 |
| Business Management | 66.5 | 62.1 | 64.1 | 64.2 |
| Propulsion Engineering & Integration | 19.5 | 16.6 | 18.0 | 18.0 |
| Shuttle System Propulsion Integration | 20.6 | 19.3 | 20.7 | 20.2 |
| Safety and Sustainability | 1.7 | 0.0 | 0.0 | 0.6 |
| Mission Directorate Support | 8.6 | 12.2 | 12.2 | 11.0 |
| Contract Administration | 26.0 | 25.5 | 23.4 | 25.0 |
| Total | 455.9 | 446.9 | 447.1 | 450.0 |
| SPACE SHUTTLE TOTAL | 3191.0 | 2851.3 | 2624.1 | 2888.5 |

*FIG. 14*

BUDGET ESTIMATE

| SPACE SHUTTLE ($ millions) | APPLICANT NO COST REDUCTIONS | APPLICANT WITH COST REDUCTIONS |
|---|---|---|
| FLIGHT AND GROUND OPERATIONS | | |
| Launch and Landing (KSC) | 706.1 | 353.1 |
| Landing Operations (DFRC) | 3.7 | 3.7 |
| Mission Operations | 226.2 | 226.2 |
| Flight Crew Operations | 85.6 | 85.6 |
| Space and Life Sciences | 12.6 | 12.6 |
| Total | 1034.2 | 681.1 |
| FLIGHT HARDWARE | | |
| Orbiter | 534.1 | 267.1 |
| EVA | 0.2 | 0.2 |
| External Tank | 1324.8 | 1324.8 |
| Reusable Solid Rocket Motors | 1414.8 | 1414.8 |
| Space Shuttle Main Engine | 1101.6 | 1101.6 |
| Solid Rocket Boosters | 700.2 | 700.2 |
| SSC Test Support | 29.3 | 29.3 |
| Total | 5105.0 | 4837.9 |
| PROGRAM INTEGRATION | | |
| Systems Engineering and Integration | 79.4 | 79.4 |
| Safety and Mission Assurance | 42.5 | 42.5 |
| Flight Software | 106.9 | 55.5 |
| Flight Operations and Integration | 54.0 | 54.0 |
| Management Integration and Planning | 28.2 | 28.2 |
| Business Management | 64.2 | 64.2 |
| Propulsion Engineering & Integration | 18.0 | 18.0 |
| Shuttle System Propulsion Integration | 20.2 | 20.2 |
| Safety and Sustainability | 0.6 | 0.6 |
| Mission Directorate Support | 11.0 | 11.0 |
| Contract Administration | 25.0 | 25.0 |
| Total | 450.0 | 396.6 |
| SPACE SHUTTLE TOTAL | 6589.2 | 5915.6 |

*FIG. 16*

COMMERCIALLY FEASIBLE METHOD OF FLYING REPEATED ORBITAL MISSIONS USING A SPACE VEHICLE

This application claims the benefit of Provisional Application Ser. No. 61/556,212, filed Nov. 5, 2011, incorporated herein by reference and Provisional Application Ser. No. 61/556,209, filed Nov. 5, 2011, incorporated herein by reference.

FIELD OF THE INVENTION

The present application relates to a commercially feasible method of flying repeated orbital missions using a Space Shuttle Program (SSP) Orbital Vehicle.

BACKGROUND

The SSP was a manned orbital rocket and spacecraft system (a "SSP system") operated by National Aeronautics and Space Administration (NASA) on well over 100 missions from 1981 to 2011. The SSP combined rocket launch, orbital spacecraft, and re-entry spaceplane with modular add-ons.

The SSP system is technically sound and was built and operated at great cost to U.S. taxpayers. It would be advantageous if a commercial use could be found for the existing SSP system.

SUMMARY OF THE INVENTION

In one embodiment, the present application provides a commercially feasible method of flying repeated orbital missions using a Space Shuttle Program (SSP) Orbital Vehicle, the method comprising:
  providing a SSP Orbital Vehicle operable at a fixed program cost and a variable per orbital mission cost, the SSP Orbital Vehicle comprising a payload bay optionally comprising a pressure vessel comprising a passenger bay module adapted to provide and maintain habitable conditions for up to forty four passengers during a mission comprising traveling from earth to space and back to earth, the passenger bay module comprising a number of sleeper cabins;
  generating revenue that meets or exceeds the fixed program cost and the variable per orbital mission cost by operating an average annual number of missions having an average length per mission, the missions being selected from the group consisting of a first number of cargo missions, a second number of commercial passenger missions, and a combination thereof;
  maintaining an average Passenger load factor of 88% or more calculated over three or more consecutive fiscal years of flying the repeated orbital missions.

In one embodiment, the application provides a commercially feasible method of flying repeated orbital missions using a Space Shuttle Program (SSP) Orbital Vehicle, the method comprising:
  providing a SSP Orbital Vehicle operable at a fixed program cost and a variable per orbital mission cost, the SSP Orbital Vehicle comprising a payload bay optionally comprising a pressure vessel comprising a passenger bay module adapted to provide and maintain habitable conditions for up to forty four passengers during a mission comprising traveling from earth to space and back to earth, the passenger bay module comprising five (5) or more sleeper cabins;
  generating revenue that meets or exceeds the fixed program cost and the variable per orbital mission cost by operating an average annual number of missions having an average length per mission, the missions being selected from the group consisting of a first number of cargo missions, a second number of commercial passenger missions, and a combination thereof;
  maintaining an average Passenger load factor of 88% or more calculated over three consecutive fiscal years of operating the commercial passenger missions by selling thirty-nine (39) or more passenger seats per mission at a passenger seat price of $10 million or less and varying one or more feature selected from the group consisting of a number of passenger seats sold per mission, a life support fee per passenger, a number of sleeper cabins sold, and a sleeper cabin price.

In one embodiment, the application provides a commercially feasible method of flying repeated orbital missions using a Space Shuttle Program (SSP) Orbital Vehicle, the method comprising:
  providing a SSP Orbital Vehicle operable at a fixed program cost and a variable per orbital mission cost, the SSP Orbital Vehicle comprising a payload bay optionally comprising a pressure vessel comprising a passenger bay module adapted to provide and maintain habitable conditions for up to forty four passengers during a mission comprising traveling from earth to space and back to earth, the passenger bay module comprising five (5) or more sleeper cabins;
  generating revenue that meets or exceeds the fixed program cost and the variable per orbital mission cost by operating an average of ten (10) or more annual missions having an average length of three (3) days per mission, the missions being selected from the group consisting of a first number of cargo missions, a second number of commercial passenger missions, and a combination thereof;
  maintaining an average Passenger load factor of 88% or more calculated over three or more consecutive years of operating the repeated orbital missions by selling an average of thirty-nine (39) or more passenger seats per mission at an average passenger seat price of from $7 million to $10 million, selling five (5) or more sleeper cabins at an average sleeper cabin price from $6 million to $10 million, charging an average life support fee of $450,000 or more per passenger, and varying the price of any optional services and amenities.

BRIEF DESCRIPTION OF THE DRAWINGS

In the following Figures, like parts are referred to by like numerals:

FIG. 8a is a perspective view of a support scaffold adapted to support the cylindrical casing in Longeron attachment mechanisms.

FIG. 13 is a chart giving the mass estimate results from Example 1.

FIG. 14 is a Table of NASA'S 2009 Fiscal Year Budget Estimate.

FIG. 16 is a sample Price Sheet used to more efficiently allocate available space in the SSPOV to generate additional revenue.

DETAILED DESCRIPTION

Figure 1:
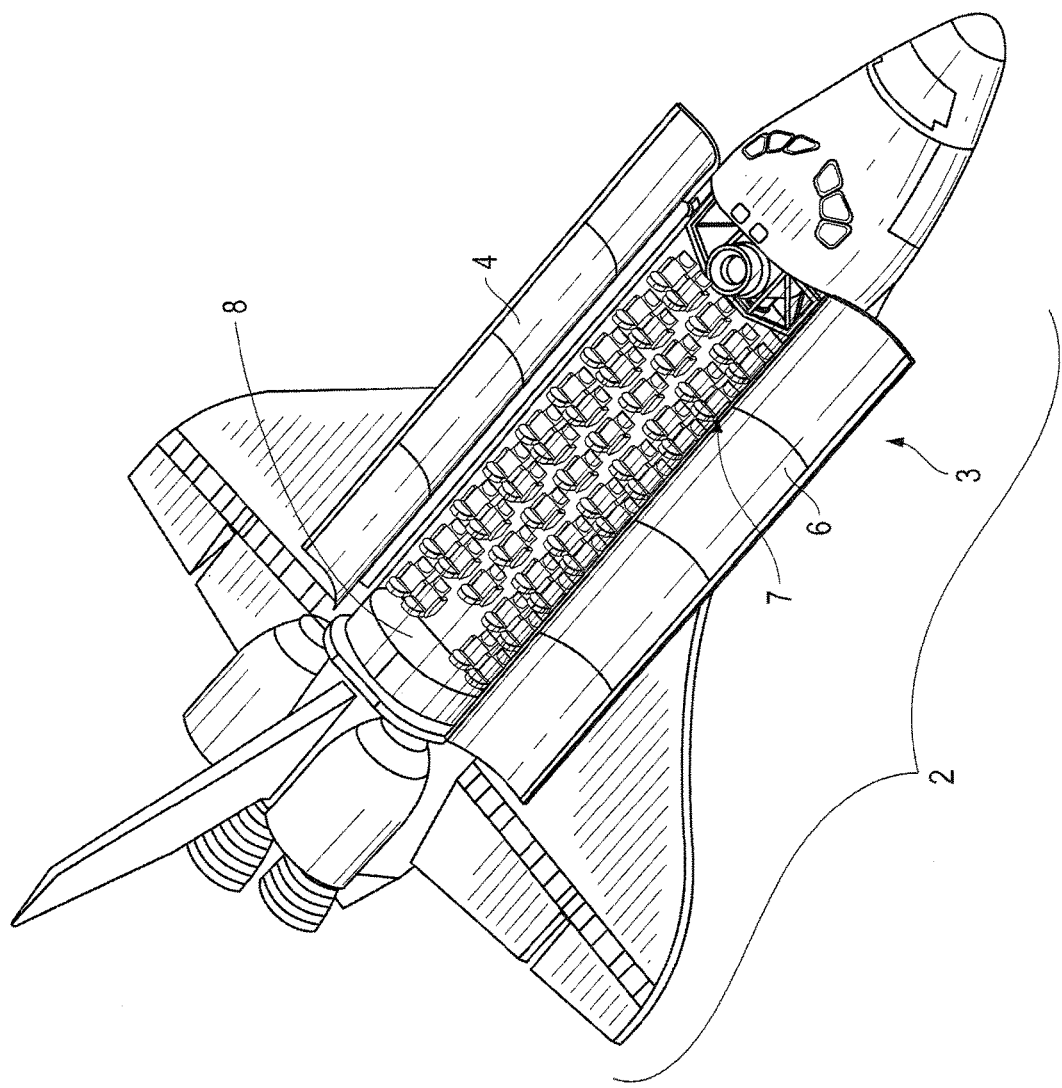
FIG. 1 is a perspective view of the SSP system, with an open payload bay loaded with a cylindrical casing comprising an embodiment of a passenger bay module.

The present application relates to a commercially feasible method of repeatedly operating a Space Shuttle Program (SSP) Orbital vehicle. In one embodiment, the SSP Orbital vehicle comprises a payload bay that optionally comprises a passenger bay module adapted to provide and maintain habitable conditions for twenty or more passengers during a mission traveling from earth to space and back to earth. In one embodiment, the passenger bay module is adapted to provide and maintain habitable conditions for an average of thirty nine or more passengers during a mission traveling from earth to space and back to earth. In one embodiment, the passenger bay module is adapted to provide and maintain habitable conditions for forty four passengers or less during a mission traveling from earth to space and back to earth. In one embodiment, the application provides an embodiment of a cylindrical casing comprising the passenger bay module, a lavatory module, and service galley.

In one embodiment, the method provides a SSP Orbital Vehicle operable at a fixed program cost and a variable per orbital mission cost. In one embodiment, the method comprises independently varying one or more operating parameter selected from the group consisting of an average annual number of missions, an average length of missions, an average number of passenger seats sold, an average passenger seat price, an average life support fee per passenger, an average number of sleeper cabins sold, an average sleeper cabin price, average amenity fees, and any other fees and/or parameters in a fashion effective to (a) produce sufficient demand, and (b) ensure that operation of the average annual number of missions is effective to generate average revenue that meets or exceeds the average fixed program costs and the average variable program costs. In one embodiment, operation of the average annual number of missions three or more consecutive fiscal years exceeds the average fixed and variable costs per mission. In one embodiment, operation of the average annual number of missions over three or more consecutive fiscal years exceeds the average fixed and variable costs per mission.

In one embodiment, the operating parameters are adjusted to maintain an average passenger seat price at or below $10 million. In one embodiment, the operating parameters adjusted to maintain an average passenger seat price below $10 million.

In one embodiment, the operating parameters are adjusted to maintain an average sleeper cabin price at or below $10 million. In one embodiment, the operating parameters are adjusted to maintain an average sleeper cabin price below $10 million.

The missions may have any length as long as there is sufficient demand and the operating parameters generate revenue that meets or exceeds the fixed program. costs and variable program costs. In one embodiment, the operating parameters generate average revenue that exceeds the average fixed program costs and variable program costs. In one embodiment, over three or more consecutive fiscal years, the operating parameters generate average revenue that exceeds the average annual fixed program costs and variable program costs.

In one embodiment, the mission length is maintained at one month or less. In one embodiment, the mission length is maintained at three weeks or less. In one embodiment, the mission length is maintained at two weeks or less. In one embodiment, the mission length is maintained at ten days or less. In one embodiment, the mission length is maintained at nine days or less. In one embodiment, the mission length is maintained at eight days or less. In one embodiment, the mission length is maintained at seven days or less. In one embodiment, the mission length is maintained at six days or less. In one embodiment, the mission length is maintained at five days or less. In one embodiment, the mission length is maintained at four days or less. In one embodiment, the mission length is maintained at three (3) days or less. In one embodiment, the mission length is more than two days.

In one embodiment, the annual number of missions is one or more. In one embodiment, the annual number of missions is two or more. In one embodiment, the annual number of missions is three or more. In one embodiment, the annual number of missions is four or more. In one embodiment, the annual number of missions is five or more. In one embodiment, the annual number of missions is six or more. In one embodiment, the annual number of missions is seven or more. In one embodiment, the annual number of missions is eight or more. In one embodiment, the annual number of missions is nine or more. In one embodiment, the annual number of missions is ten or more. In one embodiment, the annual number of missions is more than ten.

In one embodiment, the annual number of annual missions is 18 or less. In one embodiment, the annual number of annual missions is 17 or less. In one embodiment, the annual number of missions is 16 or less. In one embodiment, the annual number of missions is 15 or less. In one embodiment, the annual number of missions is 14 or less. In one embodiment, the annual number of missions is 13 or less. In one embodiment, the annual number of missions is 12 or less. In one embodiment, the annual number of missions is 11 or less.

In one embodiment, the method generates revenue that meets or exceeds the average fixed program cost and the variable per orbital mission cost by operating an average of ten (10) or more missions per year lasting an average of three (3) days per mission.

In one embodiment, the missions are selected from the group consisting of a first number of cargo missions, a second number of commercial passenger missions, and a combination thereof. In one embodiment, the missions are cargo missions. In one embodiment, the missions are commercial passenger missions. In one embodiment, the missions are a combination of cargo missions and commercial passenger missions.

Passenger Load Factor

In one embodiment, the method comprises maintaining an effective average Passenger load factor. The "Passenger load factor" is a measure of the amount of utilization of the total available capacity of a transport vehicle.

In a simple case:
$P_{up}$ is number of passengers seats filled on launch.
$P_{down}$ is number of passenger seats filled on the landing.
$L_{seats}$ is total number of seats $$P_{load\ factor} = (P_{up} + P_{down})/(L_{seats}*2)$$

In this simple case, the Passenger Load Factor for a passenger bay with 44 seats would be:

$$P_{load\ factor} = (P_{up} + P_{down})/88$$

A more complex case assumes, for example, that the sleeper cabin is equivalent to a single round trip, and:
$P_{up}$ is number of passengers seats filled on launch.
$P_{down}$ is number of passenger seats filled on the landing.
$P_{sleeper}$ is the number of sleeper cabins filled.
$L_{seats}$ is total number of seats
$S_{sleeper}$ is total number of sleeper cabins.
In this case:

$$P_{load\ factor} = (P_{up} + P_{down} + 2*P_{sleeper})/((L_{seats} + S_{sleeper})*2)$$

The Passenger Load Factor for a passenger bay with 44 seats and 5 sleeper cabins is:

$$P_{load\ factor} = (P_{up} + P_{down} + 2*P_{sleeper})/98$$

In one embodiment, the average Passenger load factor is maintained at 88% or more. In one embodiment, the average Passenger load factor is maintained at 89% or more. In one embodiment, the average Passenger load factor is maintained at 90% or more. In one embodiment, the average Passenger load factor is maintained at 91% or more. In one embodiment, the average Passenger load factor is maintained at 92% or more. In one embodiment, the average Passenger load factor is maintained at 93% or more. In one embodiment, the average Passenger load factor is maintained at 94% or more. In one embodiment, the average passenger load factor is maintained at 95% or more.

Life Support Fee

The life support fee may or may not be charged. If charged, the life support fee may vary as long as there is sufficient demand and operation of the number of missions at the selected length(s) and the relative prices of features generates revenue that meets or exceeds the fixed program costs and variable program costs. In one embodiment, the life support fee is varied to maintain a selected Passenger load factor. In one embodiment, the life support fee is varied to maintain a Passenger load factor 88% or more.

In one embodiment, no life support fee is charged. In one embodiment, the average life support fee is greater than $0 per passenger. In one embodiment, the average life support fee is $100 per passenger or more. In one embodiment, the average life support fee is $500 per passenger or more. In one embodiment, the average life support fee is $1000 per passenger or more. In one embodiment, the average life support fee is $5000 per passenger or more. In one embodiment, the average life support fee is $10,000 per passenger or more. In one embodiment, the average life support fee per passenger is: $20,000 or more; $40,000 or more; $60,000 or more; $80,000 of more; $100,000 or more; $120,000 or more; $140,000 or more; $160,000 or more; $180,000 or more; $200,000 or more; $220,000 or more; $240,000 or more; $260,000 or more; $280,000 or more; $300,000 or more; $320,000 or more; $340,000 or more; $360,000 or more; $380,000 or more; $400,000 or more; $420,000 or more; or $440,000 or more In one embodiment, the life support fee is $5 million per passenger or less. In one embodiment, the life support fee is $4 million per passenger or less. In one embodiment, the life support fee is $3 million per passenger or less. In one embodiment, the life support fee is $2 million per passenger or less. In one embodiment, the life support fee is $1 million per passenger or less.

In one embodiment, the average life support fee per passenger is from about $500 to about $800,000. In one embodiment, the average life support fee per passenger is from about $100,000 to about $700,000. In one embodiment, the average life support fee per passenger is from about $200,000 to about $600,000. In one embodiment, the average life support fee per passenger is from about $250,000 to $550,000. In one embodiment, the average life support fee per passenger is from about $300,000 to about $500,000. In one embodiment, the average life support fee per passenger is from about $350,000 to $450,000. In one embodiment, the average life support fee per passenger is $250,000 or more. In one embodiment, the average life support fee per passenger is $300,000 or more. In one embodiment, the average life support fee per passenger is $300,000 or more. In one embodiment, the average life support fee per passenger is $500,000 or less.

In one embodiment, the life support fee is $450,000 per passenger.

Passenger Seat Price

The passenger seat price may vary as long as there is sufficient demand and operation of the number of missions at the selected length(s) and the relative prices of features generates revenue that meets or exceeds the fixed program costs and variable program costs. In one embodiment, the passenger seat price is varied to maintain a selected Passenger load factor. In one embodiment, the passenger seat price is varied to maintain an average Passenger load factor 88% or more.

In one embodiment, the passenger seat price is $10 million or less. In one embodiment, the passenger seat price is below $10 million. In one embodiment, the passenger seat price is $9.9 million or less. In one embodiment, the passenger seat price is $9.8 million or less. In one embodiment, the passenger seat price is $9.7 million or less. In one embodiment, the passenger seat price is $9.6 million or less. In one embodiment, the passenger seat price is $9.5 million or less. In one embodiment, the passenger seat price is $9.4 million or less. In one embodiment, the passenger seat price is $9.3 million or less. In one embodiment, the passenger seat price is $9.2 million or less. In one embodiment, the passenger seat price is $9.1 million or less.

In one embodiment, the passenger seat price is $9 million or less. In one embodiment, the passenger seat price is $8.9 million or less. In one embodiment, the passenger seat price is $8.8 million or less. In one embodiment, the passenger seat price is $8.7 million or less. In one embodiment, the passenger seat price is $8.6 million or less. In one embodiment, the passenger seat price is $8.5 million or less. In one embodiment, the passenger seat price is $8.4 million or less. In one embodiment, the passenger seat price is $8.3 million or less. In one embodiment, the passenger seat price is $8.2 million or less. In one embodiment, the passenger seat price is $8.1 million or less. In one embodiment, the passenger seat price is $8 million or less.

In one embodiment, the average passenger seat price is $5 million or more, In one embodiment, the average passenger seat price is $6 million or more. In one embodiment, the average passenger seat price is $7 million or more. In one embodiment, the average passenger seat price is $7.1 million or more. In one embodiment, the average passenger seat price is $7.2 million or more, In one embodiment, the average passenger seat price is $7.3 million or more. In one embodiment, the average passenger seat price is $7.4 m or more. In one embodiment, the average passenger seat price is $7.5 million or more. In one embodiment, the average passenger seat price is $7.6 million or more, In one embodiment, the average passenger seat price is $7.7 million or more. In one embodiment, the average passenger seat price is $7.8 million or more. In one embodiment, the average passenger seat price is $7.9 million or more.

In one embodiment, the average passenger seat price is from $8 million to $9 million. In one embodiment, the average passenger seat price is $8.1 million or more. In one embodiment, the average passenger seat price is $8.2 million or more. In one embodiment, the average passenger seat price is $8.3 million or more. In one embodiment, the average passenger seat price is $8.4 million or more. In one embodiment, the average passenger seat price is $8.5 million or more. In one embodiment, the average passenger seat price is $8.6 million or more. In one embodiment, the average passenger seat price is $8.7 million or more. In one embodiment, the average passenger seat price is $8.8 million or more.

In one embodiment, the average passenger seat price is $8,837,295.

Sleeper Cabin Price

The number of sleeper cabins sold and the sleeper cabin price may vary as long as there is sufficient demand and operation of the number of missions at the selected length(s) and the relative prices of features generates revenue that meets or exceeds the fixed program costs and variable program costs. In one embodiment, the number of sleeper cabins sold and the sleeper cabin price is varied to maintain a selected average Passenger load factor. In one embodiment, the number of sleeper cabins sold and the sleeper cabin price is varied to maintain an average Passenger load factor 88% or more.

In one embodiment, the passenger bay module comprises one or more sleeper cabins. In one embodiment, the passenger bay module comprises two or more sleeper cabins. In one embodiment, the passenger bay module comprises three or more sleeper cabins. In one embodiment, the passenger bay module comprises four or more sleeper cabins. In one embodiment, the passenger bay module comprises five or more sleeper cabins. In one embodiment, the passenger bay module comprises five sleeper cabins In one embodiment, the sleeper cabin price is $10 million or less. In one embodiment, the sleeper cabin price is below $10 million. In one embodiment, the sleeper cabin price is $9.9 million or less. In one embodiment, the sleeper cabin price is $9.8 million or less. In one embodiment, the sleeper cabin price is $9.7 million or less. In one embodiment, the sleeper cabin price is $9.6 million or less. In one embodiment, the sleeper cabin price is $9.5 million or less. In one embodiment, the sleeper cabin price is $9.4 million or less. In one embodiment, the sleeper cabin price is $9.3 million or less. In one embodiment, the sleeper cabin price is $9.2 million or less. In one embodiment, the sleeper cabin price is $9.1 million or less.

In one embodiment, the average sleeper cabin price is $9 million or less. In one embodiment, the average sleeper cabin price is $8.9 million or less. In one embodiment, the average sleeper cabin price is $8.8 million or less. In one embodiment, the average sleeper cabin price is $8.7 million or less. In one embodiment, the average sleeper cabin price is $8.6 million or less. In one embodiment, the average sleeper cabin price is $8.5 million or less. In one embodiment, the average sleeper cabin price is $8.4 million or less. In one embodiment, the average sleeper cabin price is $8.3 million or less. In one embodiment, the average sleeper cabin price is $8.2 million or less. In one embodiment, the average sleeper cabin price is $8.1 million or less. In one embodiment, the average sleeper cabin price is $8 million or less.

In one embodiment, the average sleeper cabin price is $5 million or more, In one embodiment, the average sleeper cabin price is $6 million or more. In one embodiment, the average sleeper cabin price is $7 million or more.

In one embodiment, the average sleeper cabin price is $7.9 million or less. In one embodiment, the average sleeper cabin price is $7.8 million or less, In one embodiment, the average sleeper cabin price is $7.7 million or less. In one embodiment, the average sleeper cabin price is $7.6 million or less. In one embodiment, the average sleeper cabin price is $7.5 million or less. In one embodiment, the average sleeper cabin price is $7.4 million or less. In one embodiment, the average sleeper cabin price is $7.3 million or less, In one embodiment, the average sleeper cabin price is $7.2 million or less. In one embodiment, the average sleeper cabin price is $7.1 million or less. In one embodiment, the average sleeper cabin price is less than $7.1 million.

In one embodiment, the average sleeper cabin price is form $7,060,000 to $7,080,000. million. In one embodiment, the average sleeper cabin price is $7,060,000 or more. In one embodiment, the average sleeper cabin price is $7,065,000 or more. In one embodiment, the average sleeper cabin price is $7,070,000 or less. In one embodiment, the average sleeper cabin price is $7,069,836.

Excess Weight Fee

An excess weight fee may or may not be charged depending upon whether there is sufficient demand and operation of the number of missions at the selected length(s) and the relative prices of features generates revenue that meets or exceeds the fixed program costs and variable program costs. In one embodiment, an excess weight fee is not charged. In one embodiment, an excess weight fee is charged. In one embodiment, an excess weight fee is charged and varied to maintain a selected Passenger load factor. In one embodiment, the an excess weight fee is varied to maintain an average Passenger load factor 88% or more.

In one embodiment, operating the passenger missions further comprises charging an excess weight fee per passenger and cargo fee for every pound over a given weight. In one embodiment, the given weight is 100 lb. or more. In one embodiment, the given weight is 110 lb. or more, 120 lb. or more, 130 lb. or more, 140 lb. or more, 150 lb. or more 160 lb. or more, 170 lb. or more, 180 lb. or more, 190 lb. or more, 200 lb. or more, 205 lb. or more, 210 lb. or more, 215 lb. or more, 220 lb. or more, 225 lb. or more, 230 lb. or more, 235 lb. or more, 240 lb. or more, 245 lb. or more, or 250 lb. or more per passenger.

In one embodiment, the excess weight fee is from about $5/lb. to about $2000/lb. In one embodiment, the excess weight fee is from about $100/lb. to about $1500/lb. In one embodiment, the excess weight fee is from about $500 to about $1000/lb. In one embodiment, the average excess weight fee is about $800/lb. or more, $810/lb. or more, $820/lb. or more $830/lb. or more, $840/lb. or more, $850/lb. or more, $860/lb. or more, $870/lb. or more, $880/lb. or more, $890/lb. or more, $900/lb. or more, $910/lb. or more, $920/lb. or more, $930/lb. or more, $940/lb. or more, $950/lb. or more, $960/lb. or more, $970/lb. or more, $975/lb. or more, $980/lb. or more, $985/lb. or more, $990/lb. or more, or $995/lb. or more. In one embodiment, the average excess weight fee is $999 per pound.

Return Cargo Fee

In one embodiment, operating the passenger missions further comprises charging a return cargo fee per pound for transporting cargo back to earth.

A return cargo fee may or may not be charged depending upon whether there is sufficient demand and operation of the number of missions at the selected length(s) and the relative prices of features generates revenue that meets or exceeds the fixed program costs and variable program costs. In one embodiment, a return charge fee is not charged. In one embodiment, a return charge fee is charged. In one embodiment, a return charge fee is charged and varied to maintain a selected Passenger load factor. In one embodiment, a return charge fee is varied to maintain an average Passenger load factor 88% or more.

In one embodiment, an average return cargo fee of from about $5/lb. to about $2000/lb is charged. In one embodiment, the average return cargo fee is from about $10/lb. to about $1500/lb. In one embodiment, the average return cargo fee is from about $20 to about $1300/lb. In one embodiment, the average return cargo fee is about $40/lb. or more, $45/lb. or more, $50/lb. or more $55/lb. or more, $60/lb. or more, $65/lb. or more, $70/lb. or more, $75/lb. or more, $80/lb. or more, $85/lb. or more, $90/lb. or more, $95/lb. or more, $96/lb. or more, $97/lb. or more, $98/lb. or more, $99/lb. or more. In one embodiment, the average return cargo fee is $99 per pound.

Mission

In one embodiment, each mission comprises: securing the passengers in seats in the passenger bay module; launching the SSP Orbital Vehicle from a take-off site on earth while the passengers are secured in the passenger bay module; transporting the SSP Orbital vehicle and the passengers in the passenger bay to a location in space; maintaining safe and habitable conditions for the passengers in the passenger bay module during each mission; transporting the SSP Orbital vehicle and the passengers in the passenger bay back to earth; and, landing the SSP Orbital vehicle at a landing location on earth. In one embodiment, the mission comprises securing 39 or more passengers, 40 or more passengers, 41 or more passengers, 42 or more passengers, 43 or more passengers, or 44 or more passengers in the passenger bay module. In one embodiment, the location in space comprises the International Space Station (ISS).

The SSP Orbital Vehicle and the sleeper cabins are described in more detail below.

The SSP Orbital Vehicle

The application also provides a method of using the SSP Orbital Vehicle comprising the cylindrical casing optionally comprising the passenger bay module.

Upon launch, the SSP generally comprises: an SSP Orbital Vehicle; one or more recoverable rocket boosters; one or more external propellant tanks; a payload bay; and supporting infrastructure. The general structure of components of the SSP are known. http://en.wikipedia.org/wiki/Space_Shuttle (Ex. A, incorporated herein by reference). In one embodiment, the SSP complies with NSTS 07700, Volume I, Revision G, Dec. 17, 1997 (Ex. B, incorporated herein by reference).

The SSP Orbital Vehicle is a type of reusable winged "space-plane." In one embodiment, the SSP Orbital Vehicle resembles a conventional aircraft. In one embodiment, the SSP Orbital Vehicle carries crews and payloads into low Earth orbit. In one embodiment, the SSP Orbital Vehicle is adapted to safely re-enter the earth's atmosphere. In one embodiment, the SSP Orbital Vehicle is adapted to land safely at a location on earth.

In one embodiment, the SSP Orbital Vehicle is adapted to land as a glider. A glider is a heavier-than-air craft that is supported in flight by the dynamic reaction of the air against its lifting surfaces. Free flight of a glider does not depend on an engine.

The Payload Bay

Referring to FIG. 1, the SSP Orbital Vehicle 2 comprises a fuselage 3 comprising a payload bay 7. As seen in FIG. 1, the SSP Orbital Vehicle generally comprises an opening through the top of the SSP Orbital Vehicle 2 for loading the payload bay 7. In one embodiment, the SSP Orbital Vehicle 2 comprises opposed hinged doors 4, 6 that open to load the payload bay 7.

The Cylindrical Casing

In one embodiment, the present application provides a cylindrical casing adapted to be loaded into a payload bay of a Space Shuttle Program (SSP) Orbital Vehicle. In one embodiment, the cylindrical casing is adapted to transport and maintain habitable conditions for twenty or more passengers during a mission. In one embodiment, the cylindrical casing is loaded into a SSP Orbital Vehicle. In one embodiment, the application provides a method of using the SSP Orbital Vehicle comprising a payload bay loaded with the cylindrical casing.

Figure 4:
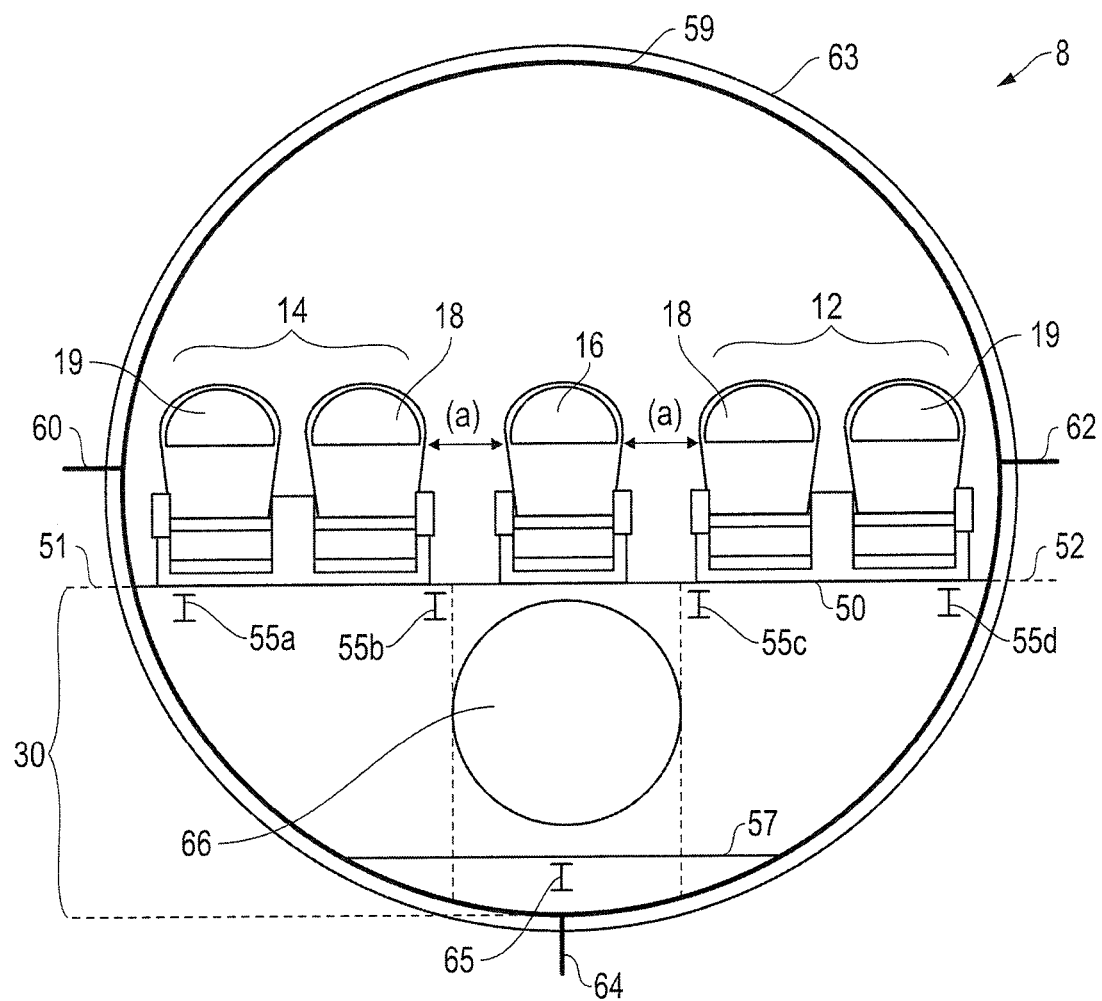
FIG. 4 is a cross section taken along line 21-21' of FIG. 3.

In one embodiment, referring to FIG. 4, the cylindrical casing 59 comprises any strong, lightweight, flexible metal, combination of metals, or carbon composite material, capable of withstanding substantial pressure. In one embodiment the cylindrical casing 59 comprises a material selected from the group consisting of aluminum, a blend of aluminum-lithium, and carbon composite. Suitable cylindrical casings include, for example, pressure vessels. Suitable pressure vessels are commercially available from a variety of sources, for example, Amalga Composite, Inc. of West Allis, Wis. and Lockheed Martin of New Orleans, La. In one embodiment, the cylindrical casing 59 comprises 23 pieces of aluminum-lithium, commercially machined by AAR Precision Systems of Huntsville, Ala. In one embodiment, the cylindrical casing 59 is welded by Lockheed Martin of New Orleans, La.

In one embodiment, the cylindrical casing 8 comprises an Orbital Docking Port System (ODS) comprising one or more orbital docking port (ODP) at a proximal end, a lavatory module at a distal end, and a passenger bay module extending between the ODP and the lavatory module. In one embodiment, the ODS comprises interface connections adapted to mate with receiving connections at the International Space Station. In one embodiment, the ODP provides a pathway for passengers to pass from the SSP Orbital Vehicle and to the International Space Station (ISS).

Referring to FIG. 1, in one embodiment, the application provides a cylindrical casing 8 adapted to be loaded into the payload bay 7. In one embodiment, referring to FIG. 2, the cylindrical casing 8 comprises a passenger bay module 10, a service galley module 30, an Orbital Docking Structure (ODS) (40 in FIG. 3) comprising one or more Orbital Docking Ports (ODP) (66 in FIG. 4), and a lavatory module 20.

In one embodiment, referring to FIG. 4, the cylindrical casing 8 comprises a plurality of external attachment trunnions. In one embodiment, the external attachment trunnions meet the specifications in the Shuttle Orbiter/Cargo Standard Interfaces (CORE), ICD-2-19001, Revision L, prepared by Boeing North American, Inc. (Exhibit C, incorporated herein by reference). In one embodiment, the dimensions of the external attachment trunnions are adapted to mate with the Longeron attachment mechanisms in the payload bay 7. Longeron attachment mechanisms are depicted in Ex. C at 3C-15 through 3C-17.

The external attachment trunnions may be made of a variety of metals or carbon composites. Examples of suitable metals include aluminum, a blend of aluminum and lithium, titanium, or carbon composite. In one embodiment, the external trunnions comprise a blend of aluminum and lithium. Suitable Al—Li is available from Alcoa, Davenport, Iowa.

Figure 7:
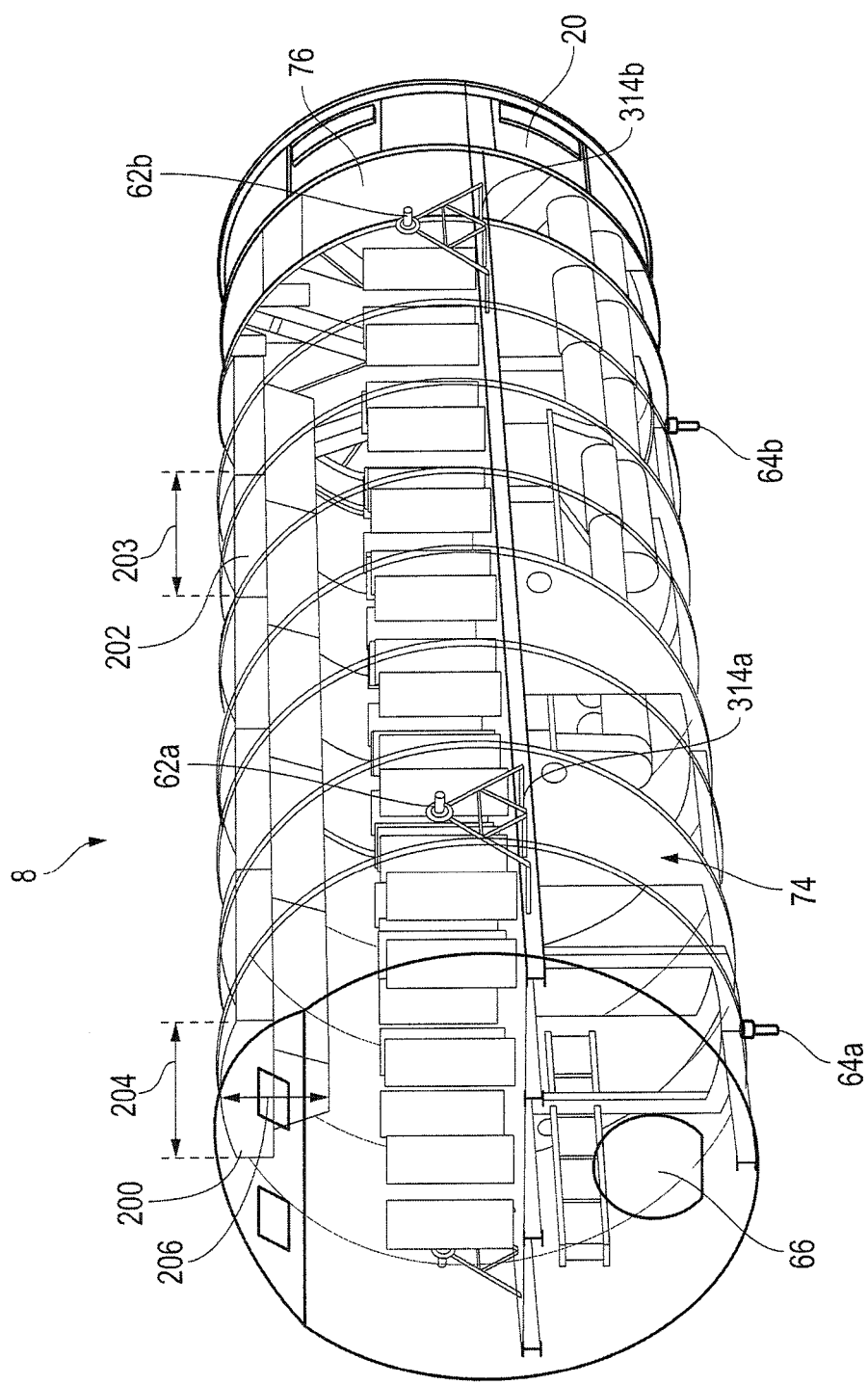
FIG. 7 is a port frontal perspective schematic view of the cylindrical casing.

In the embodiment illustrated in FIG. 4, the cylindrical casing 8 comprises a first lateral attachment trunnion 60 and a second lateral attachment trunnion 62. In one embodiment, referring to FIG. 4, the first attachment trunnion 60 and second attachment trunnion 62 are diametrically opposed to one another along the outer circumference of the cylindrical casing 8. In other words, referring to FIG. 4, a line (a) drawn from the first attachment trunnion 60 to the second attachment trunnion 62 represents the diameter of the cylindrical casing 8. In one embodiment, the cylindrical casing 8 comprises two attachment trunnions on each side of the cylindrical casing. This embodiment is illustrated in FIG. 7, in which attachment trunnions 62a and 62b (FIG. 7) are visible on one side of the cylindrical casing 8.

Figure 8:
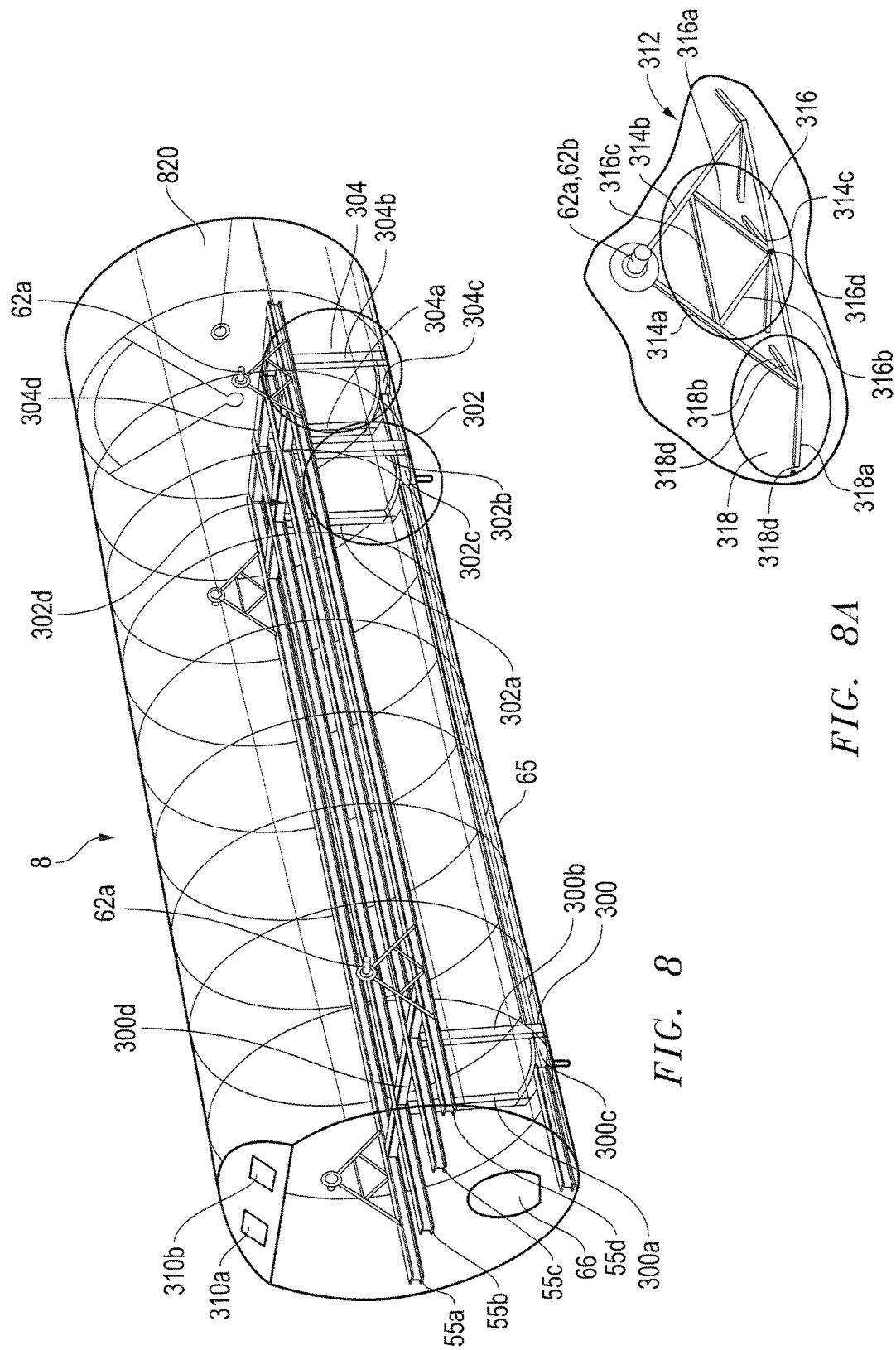
FIG. 8 is a port frontal perspective view of the cylindrical casing containing only the structural support.

In one embodiment, referring to FIG. 8a, the external lateral attachment trunnions 62a, 62b (FIG. 8, opposed lateral side not shown) communicate with a scaffold 312. In one embodiment, all of the lateral external attachment trunnions communicate with a scaffold support 312 comprising scaffold beams 314a-c. In one embodiment, the scaffold beams 314a-c form a first isosceles triangle. In one embodiment, first side beams 314a and 314b communicate at a 90° angle to form an apex communicating with the external attachment trunnions 62a, 62b. In one embodiment, opposed ends of first side beams 314a and 314b communicate with a first hypotenuse beam 314c. In one embodiment, the scaffold support 312 comprises a nested scaffold support 316. In one embodiment, the nested scaffold support 316 comprises nested scaffold beams 316a-c forming a second isosceles triangle. In one embodiment, nested side beams 316a and 316b communicate at a 90° angle to form an apex 316d communicating at a midpoint with the first hypotenuse beam 314c. In one embodiment, opposed ends of second side beams 316a and 316b communicate with a second hypotenuse beam 316c. In one embodiment, the support scaffold 312 also comprises a plurality of lower retainers 318. In one embodiment, the lower retainers comprise two beams 318 and 318b extending from an apex 318c to form a third 90° angle. In one embodiment, opposed ends 318d of the two beams 318a, 318b abut the sheet structure (described below).

In one embodiment, depicted in FIG. 4, the cylindrical casing 8 further comprises one or more keel trunnion 64. In one embodiment, one or more keel trunnions 64 are radially displaced at an angle of approximately 90° from the first attachment trunnion 60 and the second attachment trunnion 62. In one embodiment, the cylindrical casing comprises two keel trunnion 64a and 64b spaced apart along the bottom of the cylindrical casing 8. The keel trunnions 64a and b are adapted to mate with corresponding structure in the payload bay 7. In one embodiment, the keel trunnions 64a and 64b are adapted to mate with corresponding Longeron attachment mechanisms.

In one embodiment, the attachment to the passenger bay is passive. In one embodiment, the attachment to the passenger bay is active. In the active embodiment, the cylindrical casing 8 is removable and/or deployable to another location. For example, the cylindrical casing 8 may be removed and placed in the International Space Station (ISS) for a period of time. In one embodiment, the cylindrical casing may be removed and installed in another SSP Orbital Vehicle. In one embodiment, the cylindrical casing may be removed and attached to a Space Tug. In one embodiment, the cylindrical casing may be removed and attached to a booster rocket. In one embodiment, the cylindrical casing meets the specifications of CORE Section 4.2 Crew Module and Payload Habitable Volumes.

In one embodiment, the cylindrical casing may be removed and placed in a vehicle other than an SSP Orbital Vehicle. In one embodiment, the cylindrical casing may be removed and placed in a base on a distant planet. In the active embodiment, the mission may be longer than 14 days, depending on life support and other amenities available at the deployment location.

The Shell Structure

In one embodiment, the cylindrical casing is encased in a shell structure adapted to provide a pressure and thermal barrier between the one or more passengers. In one embodiment, the cylindrical casing 8 is encased in a shell structure adapted to prevent penetration of micrometeorites into the cylindrical casing 8. In one embodiment, shell structure prevents atomic oxygen from degrading the space facing radiant properties. In one embodiment, the shell structure reduces the conductive flow of heat across the shell structure. In one embodiment, the shell structure provides a path for return air. In one embodiment, the return air acts as a working fluid for thermal control.

The thickness of the shell structure may vary with the dimensions of the other components of the cylindrical casing. In one embodiment, the cylindrical casing combined with the shell structure has a combined outer diameter that fits in the payload bay. In one embodiment, the combined outer diameter of the cylindrical casing together with the shell structure is 86 inches.

In one embodiment, the shell structure is a layered structure. In one embodiment, the shell structure comprises three layers. In one embodiment, the total thickness of the shell structure is 3 inches. In one embodiment, the total thickness of the shell structure is about 3 inches or less. In one embodiment, the total thickness of the shell structure is less than 3 inches. In one embodiment, the total thickness of the shell structure is: about 2 inches or less; about 1.8 inches or less; about 1.6 inches or less; about 1.4 inches or less; about 1.2 inches or less. In one embodiment, the total thickness of the shell structure is about 1 inch or less. In one embodiment, the total thickness of the shell structure is 1 inch.

In one embodiment, the shell structure comprises an outer layer of fire resistant material. In one embodiment, the outer layer is a layer of beta cloth. Beta cloth comprises is a fireproof cloth made of fine woven silica fiber, similar to fiberglass. Beta cloth melts only at temperatures exceeding 650° C. In one embodiment, the betacloth is coated with Teflon™ to reduce its tendency to crease or tear when manipulated, and to increase durability. Beta cloth is commercially available from Saint-Gobain Performance Plastics of Merrimack, N.H. doing business as Chemfab. In one embodiment, beta cloth is a fiberglass woven cloth impregnated with PTFE Teflon and contains no silicon to protect against atomic oxygen degradation. In one embodiment the outer layer has a thickness of: from about 0.1 to about 2 inches; about 0.2 inches or more; about 0.4 inches or more; about 0.6 inches or more; about 0.8 inches or more; 1 inch or more. In one embodiment, the outer layer has a thickness of about 1 inch. In one embodiment, the outer layer has a thickness of 1 inch. In one embodiment, the outer layer has a thickness of 1 inch or less.

In one embodiment, the shell structure comprises a middle layer comprising one or more lightweight, flexible metal sheet. In one embodiment, the lightweight, flexible metal sheet comprises one or more of the following materials: aluminum, lithium, and a blend thereof. In one embodiment the lightweight, flexible metal sheet comprises an Al—Li blend. Suitable Al—Li flexible metal sheets are commercially from Alcoa, Davenport, Iowa. In one embodiment the middle layer has a thickness of: from about 0.1 to about 2 inches; about 0.2 inches or more; about 0.4 inches or more; about 0.6 inches or more; about 0.8 inches or more; 1 inch or more. In one embodiment, the middle layer has a thickness of about 1 inch. In one embodiment, the middle layer has a thickness of 1 inch. In one embodiment, the middle layer has a thickness of 1 inch or less.

In one embodiment, the shell structure comprises an inner layer of insulation material. In one embodiment, the insulation material comprises one or more of the following materials: fiberglass, polystyrene foam, polyethylene foam, polyisocyanurate, and vacuum insulated panel. In one embodiment, the insulation material is fiberglass. Suitable fiberglass insulation materials are available from a variety of commercial sources. In one embodiment, the insulation material is fiberglass sheet material, commercially available as FIBERGLAS 700 Series, from Owens Corning of Toledo, Ohio. In one embodiment the inner layer has a thickness of: from about 0.1 to about 2 inches; about 0.2 inches or more; about 0.4 inches or more; about 0.6 inches or more; about 0.8 inches or more; 1 inch or more. In one embodiment, the inner layer has a thickness of about 1 inch. In one embodiment, the inner layer has a thickness of 1 inch. In one embodiment, the inner layer has a thickness of 1 inch or less.

The Passenger Bay Module

In one embodiment, the cylindrical casing 8 comprises a passenger bay module.

In one embodiment, the passenger bay module is adapted to transport and maintain habitable conditions for twenty or more passengers during a mission. In one embodiment, the payload bay is adapted to transport and maintain habitable conditions for thirty or more passengers during a mission. In one embodiment, the payload bay is adapted to transport and maintain habitable conditions for forty or more passengers during a mission. In one embodiment, the payload bay is adapted to transport and maintain habitable conditions for forty four passengers during a mission.

In one embodiment, the mission has a duration of: 30 days or less; 20 days or less; 14 days or less; 13 days or less; 12 days or less; 11 days or less; 10 days or less; 9 days or less; 8 days or less; 7 days or less; 6 days or less; 5 days or less; 4 days or less; or 3 days or less. In one embodiment, the mission has a duration of 2 days or more. In one embodiment, the mission has a duration of 3 days.

Figure 2:
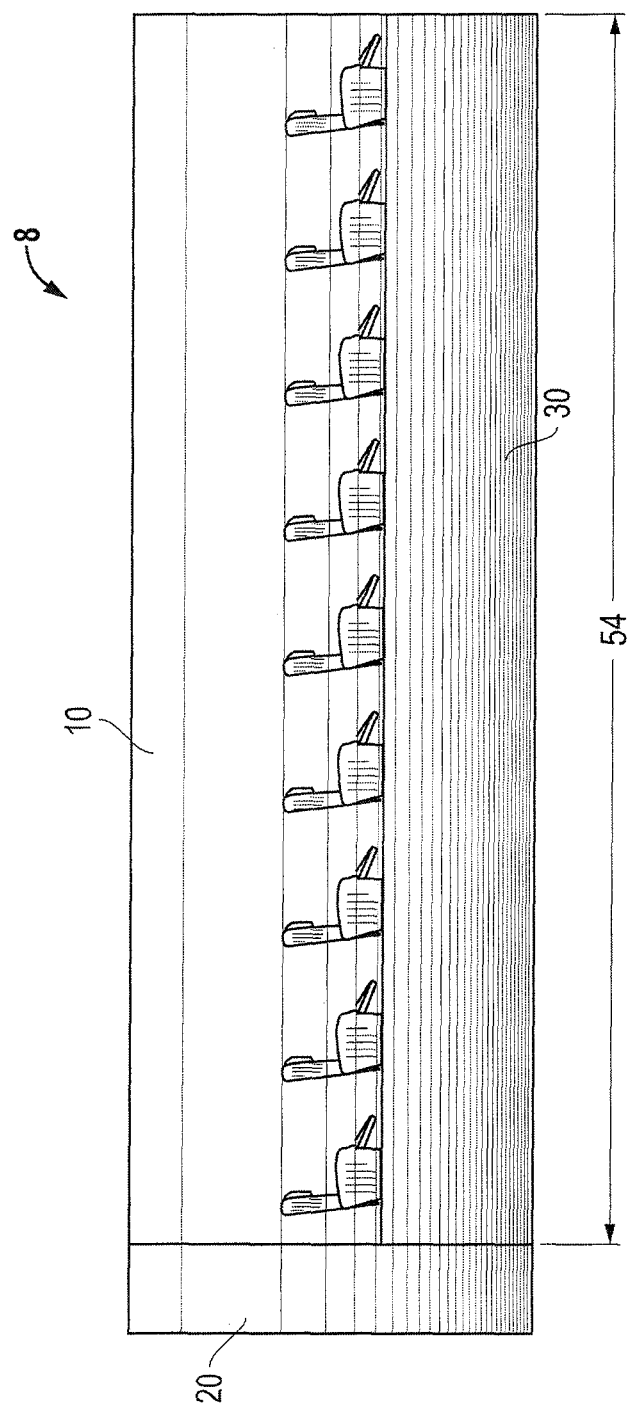
FIG. 2 is a schematic side view of a portion of the cylindrical casing comprising a passenger bay model and a lavatory module.

Referring to FIG. 2, the interior of the cylindrical casing 8 may have a variety of configurations. In the embodiment schematically represented in FIG. 2, the cylindrical casing encloses an upper passenger bay module 10, a rear lavatory module 20. and a service galley module 30 located below the passenger bay module 10. In one embodiment, referring to FIG. 3, the passenger bay module 10 extends within the cylindrical casing from the lavatory compartment 20 to the ODS 40. In one embodiment, the passenger bay module comprises at a proximal end the ODS 40.

In one embodiment, referring to FIG. 4, the passenger bay module comprises a first substantially planar floor 50 extending from one side 51 of the cylindrical casing 53 to an opposed side 52 of the cylindrical casing 53. In the embodiment illustrated in FIG. 3, the first substantially planar floor 50 is separated from and substantially parallel to the line (a) drawn between the first attachment trunnion 60 and the second attachment trunnion 62 in FIG. 3.

Figure 3:
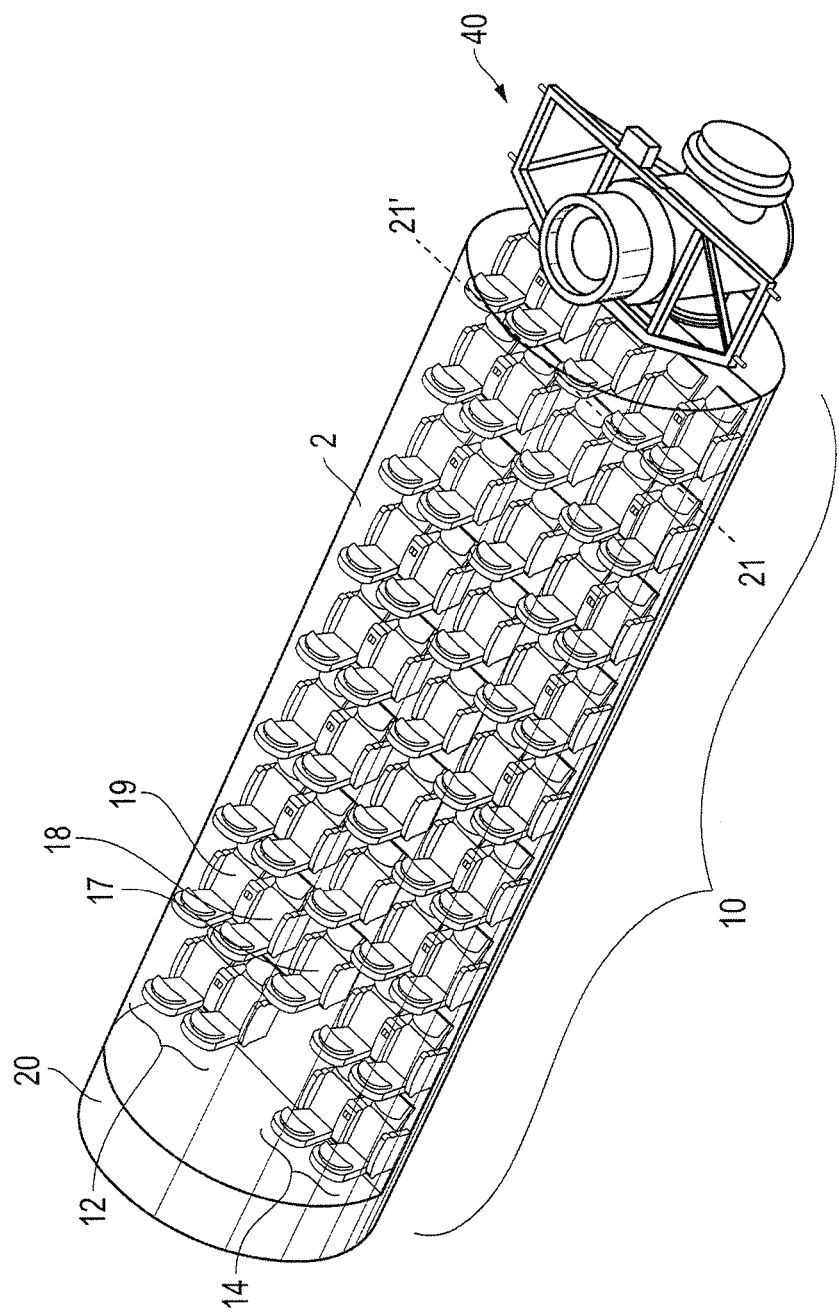
FIG. 3 is a top perspective view of the cylindrical casing enclosed in what appears as a semi-transparent shell structure.

Referring to FIG. 3, the first substantially planar floor 50 extends longitudinally from an abutting face of the ODS 40 to an abutting face of the lavatory module 20. In one embodiment, the first substantially planar floor 50 extends longitudinally from a bulkhead adjacent to an abutting face of the ODS 40 to a bulkhead adjacent to an abutting face of the lavatory module 20. In one embodiment, the first substantially planar floor 50 divides the cylindrical casing 8 into a first substantially semicylindrical compartment and a second substantially semicylindrical compartment.

The first substantially planar floor 50 may be made of a variety of materials. Suitable materials include, for example, aluminum, aluminum-lithium, carbon-epoxy composite, plastic, and wood. In one embodiment, the first substantially planar floor 50 comprises a blend of aluminum and lithium. In one embodiment, the first substantially planar floor 50 is 2190 Aluminum Lithium, commercially available from Alcoa, Davenport, Iowa. In one embodiment, the substantially planar floor 50 comprises an upper surface comprising carpet or other floor covering.

In one embodiment, the substantially planar floor 50 is welded to the interior of the cylindrical casing 8. When welding is referred to herein, the welding may be variable polarity plasma welding, friction stir welding, and/or fusion arch welding. In one embodiment, variable polarity plasma welding is used to weld the substantially planar floor to the interior of the cylindrical casing. In one embodiment, the welding is commercially available from Advanced Manufacturing Engineering Technology, Rexburg, Id. In one embodiment, the weld is purged on both sides with argon and helium. In one embodiment, the weld comprises a filler metal. In one embodiment, the filler metal is derived from a welding rod comprising any suitable welding metal. In one embodiment, the filler metal comprises aluminum. In one embodiment, the welding rod is a 4043 aluminum welding rod. In one embodiment, the resulting welds pass x-ray tests and level three fluorescent dye penetration tests.

In one embodiment, the first substantially planar floor 50 is supported by a plurality of longitudinally extending support beams. The longitudinally extending support beams may have any suitable structure. In one embodiment, the longitudinally extending support beams are "I-beams," which are shaped like the letter "I."

In one embodiment, the first substantially planar floor 50 has a width of 174 inches. In one embodiment, the first substantially planar floor 50 is supported from beneath by four longitudinally extending I-beams 55a-55d. In one embodiment, the longitudinally extending I-beams abut the first substantially planar floor 50 and extend longitudinally from a wall of the ODS 40 to the lavatory module 20. In one embodiment, the longitudinally extending I-beams abut the first substantially planar floor 50 and extend longitudinally from a bulkhead 78 adjacent to the ODS 40 to a bulkhead 76 adjacent to the lavatory module 20.

Referring to FIG. 8, a suitable I-beam support structure is depicted as comprising the four longitudinally extending I-beams 55a-55d and the longitudinally extending keel I-beam 65. In addition, the support structure also comprises a plurality of support arches.

In one embodiment, the support structure comprises one or more proximal support arches. In one embodiment, the support structure comprises one proximal support arch 300. In one embodiment, second beams 300a, 300b are welded to a first beam 300d, which perpendicularly intersects and is welded to the proximal I-beams 55a-55d. The second beams 300a, 300b extend substantially parallel to one another from the first beam 300d to distal ends welded to the interior surface of the cylindrical casing. In one embodiment, the proximal ends of the substantially parallel beams 300a, 300b intersect the first beam 300d at I-beams 55b and 55c, respectively. In one embodiment, a rounded arch beam 300c extends between distal ends of the substantially parallel beams 300a, 300b. In one embodiment, the rounded arch beam 300c, runs adjacent to the cylindrical casing 8. In one embodiment, the rounded arch beam 300c is welded to an interior surface of the cylindrical casing 8. In one embodiment, the rounded arch beam 300c intersects and is welded to the keel I-beam 65.

In one embodiment, the support structure comprises one or more aft support arches. In one embodiment, the support structure comprises a plurality of aft support arches 302 and 304. In one embodiment, the support structure comprises two aft support arches 302 and 304 having similar structure. In one embodiment, referring to aft support arch 302, the arch comprises a first beam 302d perpendicularly intersecting and welded to the I-beams 55a-55d. In one embodiment, substantially parallel beams 302a, 302b of the support arch are welded to the first beam 302d and extend substantially parallel to one another from the first beam 302d to distal ends welded to the interior surface of the cylindrical casing 8. In one embodiment, the proximal ends of the substantially parallel beams 300a, 300b intersect the first beam 300 at I-beams 55b and 55c, respectively. In one embodiment, a rounded arch beam 300c extends between distal ends of the substantially parallel beams 300a, 300b. In one embodiment, the rounded arch beam 300c, runs adjacent to the cylindrical casing 8. In one embodiment, the rounded arch beam 300c is welded to an interior surface of the cylindrical casing 8. In one embodiment, the rounded arch beam 300c intersects and is welded to the keel I-beam 65. In one embodiment, the proximal and aft support structures meet the specifications of Ex. C, Section 3.3.1 of the CORE Orbiter/Payload Structural Attachments. In one embodiment, according to the Orbiter Coordinate System (OCS), the forward connection is at $x_o$=774 in. In one embodiment, the aft connections are at $x_o$=1171.27 in.

The I-beams may be made of a variety of materials. Examples of such materials include carbon-epoxy composite, titanium, aluminum-lithium, and aluminum. In one embodiment, the I-beams are aluminum I-beams. Suitable aluminum I-beams are commercially available from American Aluminum Extrusion (AAE) of Beloit, Wis. In one embodiment, the aluminum I-beams have a depth of 6.0 inches, a flange width of 4.0 inches, a web thickness of 0.210 inches, a flange thickness of 0.350, and a weight of 4.690 pounds per foot. In one embodiment, the aluminum I-beams are made 6061-T6 aluminum alloy.

In one embodiment, the passenger bay module 10 comfortably seats a plurality of passengers. In one embodiment, the passenger bay module comprises seats for from about 5 to about 44 passengers. In various embodiments, the passenger bay module comprises seats for: 5 passengers or more; 10 passengers or more; 15 passengers or more; 20 passengers or more; 25 passengers or more; 30 passengers or more; 35 passengers or more; 40 passengers or more; 44 passengers or more. In one embodiment, the passenger bay module seats 44 passengers.

In one embodiment, the seats in the passenger bay module 10 are upright. In one embodiment, the seats in the passenger bay module comprising a reclining mechanism. In one embodiment, one or more of the passenger bay seats recline to become substantially flat. In one embodiment, all of the passenger bay seats recline to become a substantially flat. The seats may be obtained from any Federal Aviation Administration (FAA) approved supplier. In one embodiment, the seats are obtained from Weber Aircraft, LLC, Gainesville, Tex.

Referring to FIG. 3, the seating arrangement in the passenger bay module 10 may have a variety of configurations. In the depicted embodiment, the passenger bay comprises three separate rows of seats. In one embodiment, side rows 12 and 14 extend longitudinally from the ODS 40 to the lavatory compartment 20 along opposite sides of the cylindrical casing 8. As seen in FIG. 3 and FIG. 4, each side row 12, 14 comprises two seats, an aisle seat 18 and a wall seat 19. In one embodiment, a center row 16 of seats extends longitudinally from the ODS 40 to near the lavatory compartment 20 between the side rows. In one embodiment, the center row 16 comprises a row of single seats. In one embodiment, the center row 16 is separated from the side rows 12 and 14 by a distance of 15 inches.

Figure 5:
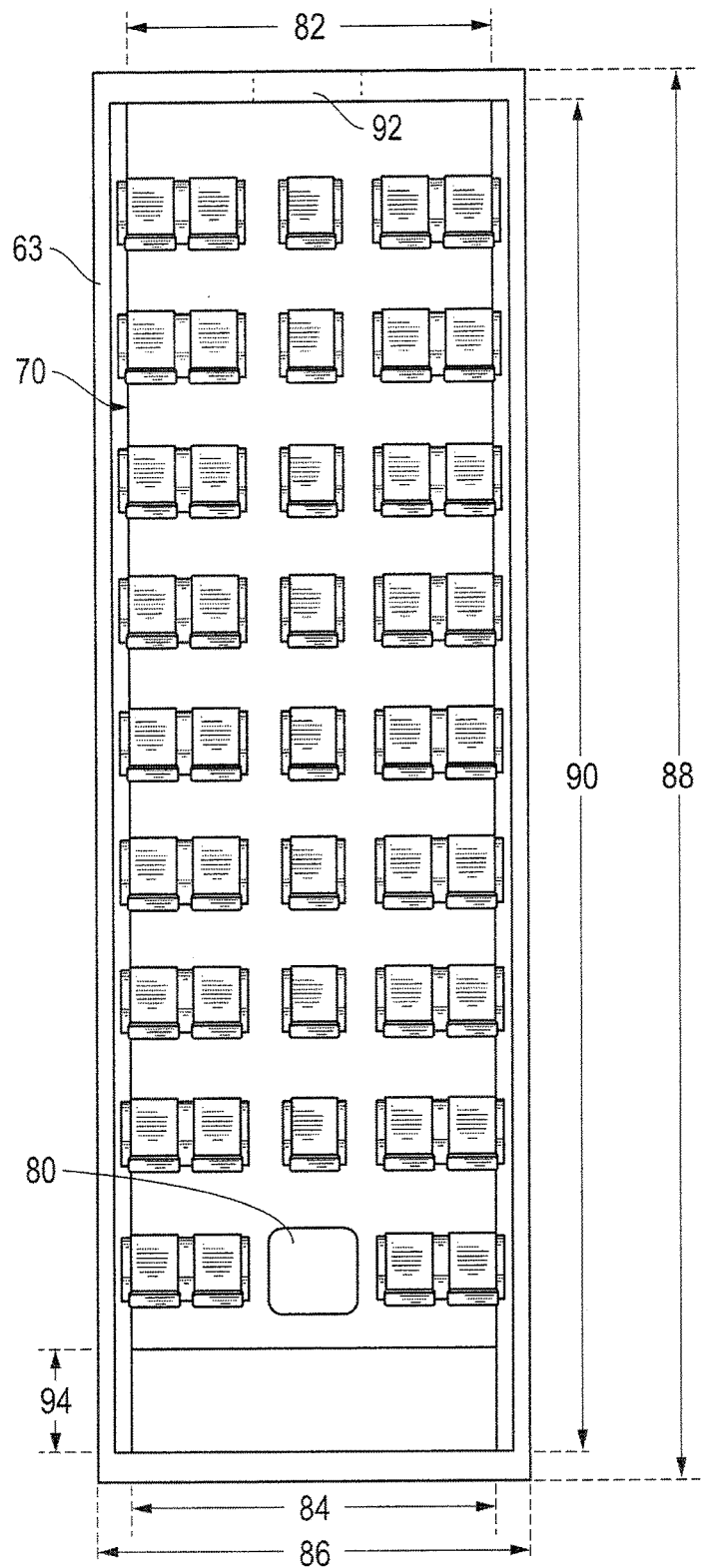
FIG. 5 is a schematic plan view looking down at an embodiment of the passenger bay module.

As seen in FIG. 3, in one embodiment, the center row 16 comprises a single row of eight seats 17 extending from adjacent to the ODS 40 to a distance spaced from the lavatory module 20. In one embodiment, referring to FIG. 5, the floor adjacent to the lavatory module 20 comprises a hatch 80 sealingly engageable with a port (not shown). In one embodiment, the hatch opens to permit a person to descend to a service galley module 30 located below the substantially planar floor 50.

In one embodiment, the maximum inner diameter (width) of the passenger bay module is 174 inches. This inner diameter is nearly that of a Boeing 767 airliner, at 186 inches. In one embodiment, referring to FIG. 4, the first substantially planar floor 50 has a width (82) of 14 ft. 3 in. In one embodiment, the passenger bay module 10 has a broadest inner diameter at (84) of 14 ft. 6 in. In one embodiment, the passenger bay module covered by the shell structure 63 has an outer diameter at (86) of 15 ft.

In one embodiment, referring to FIG. 4, the outer length at 88 of the passenger bay module 10, covered by the shell structure 63, is 49 ft. 6 in. In one embodiment, the inner length 90, from the ODP 40 to the lavatory module, is 49 in. In one embodiment, the lavatory module has a length (94) of 3 ft. 6 in.

The seats may have a variety of sizes and configurations. In one embodiment, for maximum space usage and comfort, each seat is situated within a space having a dimension of 3 ft. by 5 ft.

The seats may be provided with a variety of amenities. In one embodiment, the seats are provided with one or more seatbelts. In one embodiment, the seats are provided with 4-point harness seatbelts. In one embodiment seats are provided with an overhead harness to facilitate ingress and egress. In one embodiment, the seats are provided with arm rests. In one embodiment, the arm rests are provided with cupholders. In one embodiment, the seats are provided with trays for meals. In one embodiment, the trays are retractable trays. In one embodiment, the retractable trays are retractable into the arm rest. In one embodiment, each seat is provided with a storage compartment. In one embodiment, each seat is provided with an in-seat entertainment system. In one embodiment, the seats are provided with one or more additional amenities.

In one embodiment, referring to FIG. 7, an upper surface 200 of the passenger bay module 10 comprises a plurality of sleeper cabins 202. In one embodiment, from 1 to 5 sleeper cabins are provided. In one embodiment, the sleeper cabins are enclosed units that provide privacy. In one embodiment, the sleeper cabins 202 comprise the amenities provided for other seats located on the first substantially planar floor 50. In one embodiment, the sleeper cabins 202 comprise upgraded amenities, for example, a DVD player or video game player, a hair dryer, and the like. In one embodiment, the sleeper cabins comprise a flat bed. In one embodiment, 5 sleeper cabins 202 are provided. In one embodiment, the sleeper cabins 202 have a length (203) of about 7.25 feet, a width (204) of about 5 feet and a height (206) of about 3 feet. In one embodiment, the sleeper modules are available at a higher price than other seats in the passenger bay module. In one embodiment, the availability of the sleeper modules, together with the number of total passengers and the number of flights run, renders operation in accordance of the SPP Orbital Vehicle as described herein financially feasible.

Power System

In one embodiment, the cylindrical casing 8 is provided with a power system. In one embodiment, the power system electronically communicates with the Space Shuttle Electrical Power Distribution and Control (EPDC) subsystem. In one embodiment, the power system comprises one or more battery power storage unit. In one embodiment, the power system comprises one or more lithium iron batteries. Suitable battery power storage units are commercially available from a variety of sources. In one embodiment, the battery power storage units are lithium iron batteries, commercially available from European Batteries of Tuusula, Finland.

For relatively short missions, the EPDC and the battery power storage unit(s) may be sufficient to meet power needs during the mission. In one embodiment, the SSP system is provided with supplemental externally mounted solar panels. In one embodiment, the solar panels also communicate with the EPDC system and augment the EPDC system, as needed.

In one embodiment, an electrical power interface is provided connecting the payload bay to the passenger bay module 10. In one embodiment, the electrical power interface is any suitable plug and cable/wire system. In one embodiment, the power system draws a possible 2600 Watts of power from the Space Shuttle as specified by CORE Section 7.0 Electrical Power Interfaces.

The Service Galley Module

In one embodiment, referring to FIG. 4, the second substantially semicylindrical compartment is a service galley module 30. In one embodiment, the service galley module 30 communicates at a proximal end with the ODS 40. In one embodiment, the proximal end of the service galley module 30 communicates with the ODP, a port 66 extending from the ODS 40 into the service galley module 30.

In one embodiment, the service galley module 30 comprises a second substantially planar floor 57 spaced apart from and substantially parallel to the first substantially planar floor 50. In one embodiment, the distance between the second substantially planar floor 57 and the first substantially planar floor 50 is 5 feet 9.25 inch. In one embodiment, one or more longitudinally extending support structures 65 support the second substantially planar floor 57. In one embodiment, the one or more longitudinally extending support structure 65 is an I-beam. In one embodiment, the longitudinally extending support structure 65 is an aluminum I-beam.

In one embodiment, the service galley module 30 comprises a plurality of galleys accessible from a central access tunnel 67. In one embodiment, the galleys are separated by a plurality of bulkheads. In one embodiment, an initial bulkhead 74a is spaced approximately 10 feet from the ODP. In one embodiment, a second bulkhead 74b is spaced approximately 10 feet from the initial bulkhead 74a; a third bulkhead 74c is spaced approximately 10 feet from second bulkhead 74b; and, a fourth bulkhead 74d is spaced approximately 10 feet from third bulkhead 74c. In one embodiment, referring to FIG. 7, from 8 to 9 bulkheads 74 are spaced from the ODP 66 to the lavatory module 20. In one embodiment, a distal bulkhead 76 is located adjacent to the lavatory module 20. In one embodiment, the service galley module 30 abuts the lavatory module 20. In one embodiment, the service galley module 30 abuts the distal bulkhead 76 located adjacent to the lavatory module 20. The bulkheads also are seen in FIG. 7.

In one embodiment, the bulkheads separate one or more of the following galleys: a flight attendant galley; a pantry galley; a cargo galley; a life support galley; a storage galley; a fire detection and prevention galley; a module subsystem galley; and, a mechanical system galley. In one embodiment, the service galley module 30 comprises compartments comprising one or more of the following: a power system; a thermal control system; and, a backup system. In one embodiment, the service galley module 30 comprises one or more the following: a power system; a thermal control system; a backup system, and a combination of all of the foregoing.

Figure 6:
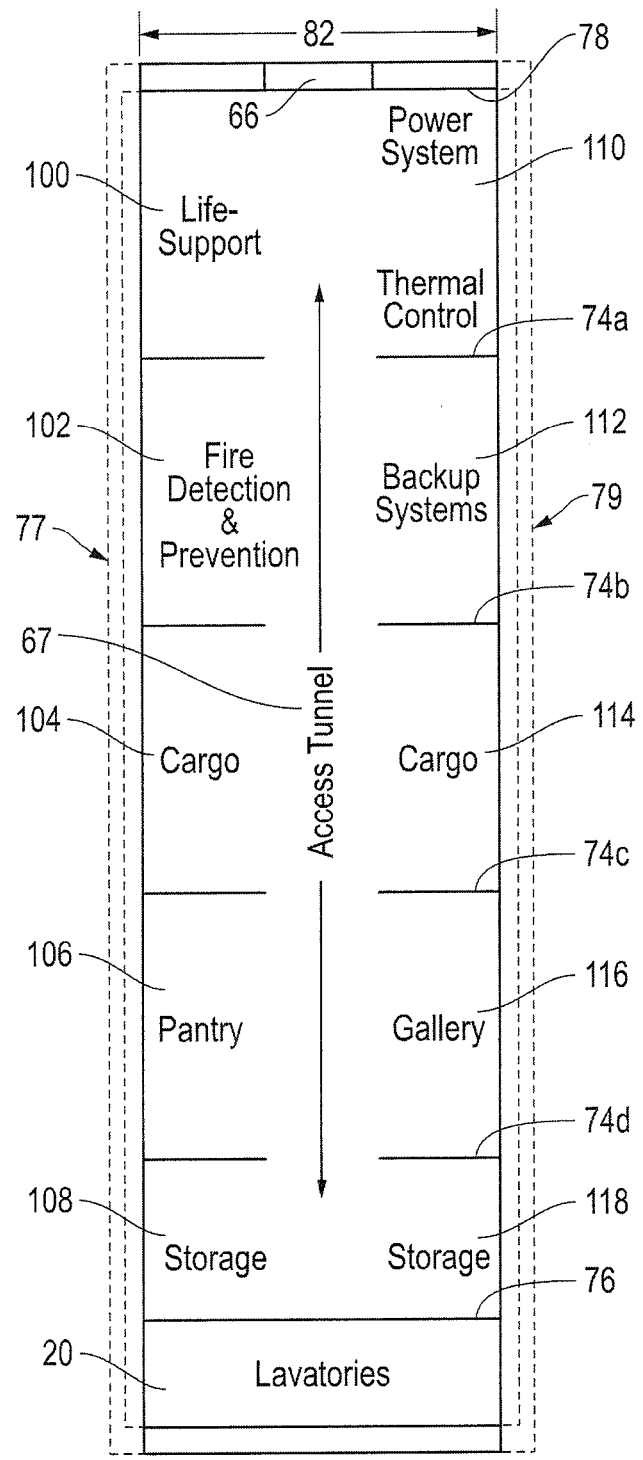
FIG. 6 is a schematic view looking down at an embodiment of a service galley module.

In one embodiment, the service galley module 30 comprises combinations of the foregoing galleys. In one embodiment, depicted in FIG. 4, the service galley module 30 comprises the following galleys spaced longitudinally along a first side 77 of the service galley module 30, in order from the ODP 66: a life support galley 100; a fire detection and prevention galley 102; a cargo galley 104; a pantry galley 106; and a storage galley 108. In the embodiment depicted in FIG. 6, the following aisle of galleys are spaced longitudinally along an opposed side 79 of the service galley module 30, in order from the ODP 66: a power system and thermal control galley 110; a backup systems galley 112; a cargo galley 114; the remainder of the pantry galley 116; and, a storage galley 118.

In one embodiment, the pantry galley provides one or more of the following: counters; heating appliances; water supply; disposal stations; and other galleys helpful in providing and serving meals and drinks, including water. In one embodiment, the pantry galley comprises one or more microwave oven. In one embodiment, the pantry galley communicates with one or more water supply.

In one embodiment, the hatch 80 (FIG. 5) and the ODP 66 (FIG. 6) comprise hatches that, when closed, provide an airtight seal. In one embodiment, the service galley module 30 provides a safe zone during an emergency or unforeseen event requiring additional protection of passengers. Such events might include, for example, an unknown approaching object and/or a solar flare. In one embodiment, the port 66 communicates with the service galley module 30 and may be sealed off. In one embodiment, the port 66 comprise external threaded grooves. In one embodiment, the port 66 is adapted to engage a hatch (not shown) comprising internal threaded grooves adapted to mate with the external threaded groves on the port 66. Suitable hatches are commercially available from a variety of sources, including Westmore Engineering Ltd. of Northumberland, United Kingdom.

The Lavatory Module

In one embodiment, the passenger bay module 10 is provided with a rotating lavatory module 20. In one embodiment, the distal end of the passenger bay module 10 abuts a rotating lavatory module 20.

Figure 11:
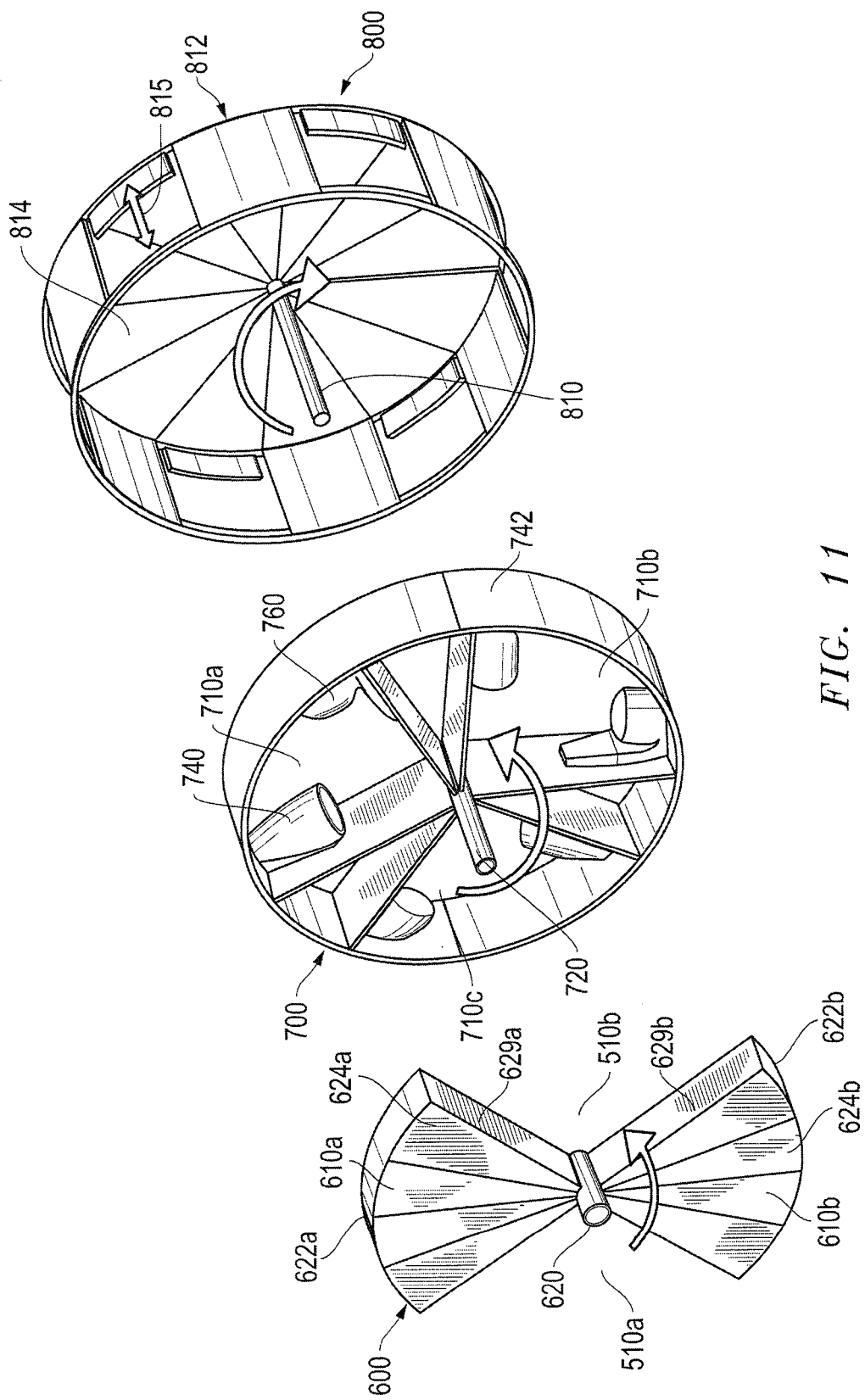
FIG. 11 is an expanded view of the lavatory module.

The rotating lavatory module 20 may have a variety of configurations. In one embodiment, referring to FIG. 11, the lavatory module 20 comprises a relevator 600, a lavatory component 700, and a counterweight compensator 800 comprising a central shaft 810.

The lavatory component 700 rotates around the central shaft 810 in a first direction. The counterweight compensator 800 rotates around the central shaft in a direction opposite to the lavatory component 700. In one embodiment, the lavatory component 700 rotates around the central shaft in a counterclockwise direction and the counterweight compensator 800 rotates around the central shaft in a clockwise direction.

In one embodiment, the relevator 600 rotates around the central shaft in the first direction. In one embodiment, the relevator 600 rotates intermittently around the central shaft in the first direction. In one embodiment, the relevator 600 rotates intermittently around the central shaft in a counterclockwise direction.

In one embodiment, the lavatory component 700 comprises a lavatory central shaft 620. In one embodiment, the lavatory component 700 is adapted to rotate around the lavatory central shaft 620 in a first direction at a speed effective to produce a centrifugal force that replicates gravity. In one embodiment, the lavatory component 700 comprises a proximal lavatory wall, a distal lavatory wall, and a circumferential lavatory wall.

In one embodiment, the relevator 600 comprises a relevator central shaft 620. In one embodiment, the relevator central shaft 620 extends longitudinally from the relevator 600 toward the passenger bay module. In one embodiment, the relevator 600 comprise a plurality of pie shaped structures 610a, 610b. In one embodiment, one or more of the pie shaped structures 610a, 610b is not solid. In one embodiment, one or more of the pie shaped structures 610a, 610b is solid. In one embodiment, all of the pie shaped structures 610a, 610b are solid.

In one embodiment, the pie shaped structures 610a, 610b comprise narrower internal ends in communication with the relevator central shaft 620. In one embodiment, the narrower internal ends extend to wider circumferential relevator end surfaces 622a, 622b. In one embodiment, the pie shaped structures comprise a substantially planar relevator distal surface (not shown). In one embodiment, the pie shaped structures comprise substantially planar relevator proximal surfaces 624a, 624b. In one embodiment, the pie shaped structures comprise lateral relevator surfaces 626a, 626b.

In one embodiment, the pie shaped structures comprise a combination of substantially planar relevator distal surfaces (not shown), substantially planar relevator proximal surfaces 624a, 624b, and lateral relevator surfaces 626a, 626b.

In one embodiment, the lateral relevator surfaces communicate with the substantially planar relevator distal surfaces (not shown) and the substantially planar relevator proximal surfaces 624a, 624b. In one embodiment, the lateral relevator surfaces are substantially perpendicular to the substantially planar relevator distal surfaces (not shown). In one embodiment, the lateral relevator surfaces are substantially perpendicular to the relevator proximal surfaces 624a, 624b. In one embodiment, the lateral relevator surfaces are substantially perpendicular to both the substantially planar relevator distal surface (not shown) and to the relevator proximal surface 624a, 624b.

In one embodiment, the lateral relevator surfaces 626a, 626b define one or more "open" pie-shaped compartments between adjacent pie shaped structures. The open pie-shaped compartments may be substantially empty, or may be fitted to ease entry of a passenger into the lavatory compartment 700. For example, the open pie-shaped compartments may be fitted with a substantially flat floor. In one embodiment, a substantially flat floor runs adjacent to the circumference. In one embodiment, one or more of the open pie-shaped compartments is fitted with an entry structure into the lavatory compartment. In one embodiment, one or more of the open pie-shaped structures is fitted with a "door." In one embodiment, the open pie-shaped compartments are empty.

In one embodiment, the substantially planar distal relevator surfaces (not shown) rotatably abut a proximal wall of the lavatory compartment (not shown). In one embodiment, the relevator 600 is adapted to rotate in the first direction around a line extending longitudinally through the relevator central shaft. In one embodiment, the relevator 600 is adapted to rotate in the first direction around a line extending longitudinally through the relevator central shaft 620 after receiving a rotate signal. In one embodiment. the relevator 600 is adapted to stop rotating around the line extending longitudinally through the relevator central shaft 620 after receiving a stop signal. In one embodiment, the relevator 600 is adapted to rotate around the line extending longitudinally through the relevator central shaft 620 in the first direction up to the speed of rotation of the lavatory compartment 700 around the same line, which also extends through the central shaft.

In one embodiment, the counterweight compensator 800 comprises a compensator central shaft 810. In one embodiment, the compensator central shaft 810 extends longitudinally from a counterweight compensator backing 814 toward the passenger bay module 10. In one embodiment, the counterweight compensator is adapted to rotate around the compensator central shaft 810 in a direction opposite the first direction. In one embodiment, a circumferential compensator wall extends from the compensator backing 814 to define a proximally extending compensator cup 812.

In this embodiment, upon assembly, the compensator backing 814 rotatably abuts the distal wall 710b of the lavatory component. In one embodiment, the compensator cup 812, defined by the compensator circumferential wall 812, extends proximally toward the passenger bay module 10. In one embodiment, the compensator cup 812 rotatably externally abuts the circumferential wall 742 of the lavatory component 700. In one embodiment, the compensator cup 812 rotatably externally abuts a circumference of the relevator, which includes the circumferential relevator end surfaces 622a, 622b.

In one embodiment, the lavatory 700 rotates at a speed effective to produce sufficient centrifugal force in the lavatory component to replicate gravity around a circumference of the laboratory component. In one embodiment, the counterweight compensator 800 rotates around the lavatory 700 at a speed effective to maintain a zero moment of inertia of the entire system.

In one embodiment, the mass of counterweight compensator 800 is less than the mass of the lavatory component 700 but the counterweight compensator rotates faster than the lavatory component 700 to maintain the zero moment of inertia of the entire system.

In one embodiment, the lavatory component 700 rotates in the first direction at a speed effective to replicate gravity. In one embodiment, the lavatory component 700 rotates in the first direction at a speed of from about 6 revolutions per minute to about 47 revolutions per minute. In one embodiment, the counterweight compensator 800 has a mass less than the lavatory component 700 and the counterweight compensator 800 rotates in a direction opposite the first direction at a greater speed than the speed of the lavatory component 700.

Knowing the mass of lavatory component 700 and the counterweight compensator 800, persons of ordinary skill in the art are able to calculate appropriate rotation speeds to maintain a zero moment of inertia of the entire system. In one embodiment, the lavatory 700 rotates in the first direction at a speed of 20 revolutions per minute and the counterweight compensator rotates in a direction opposite the first direction at a speed of 26.67 revolutions per minute. In one embodiment, the lavatory 700 rotates counterclockwise at a speed of 20 revolutions per minute and the counterweight compensator rotates clockwise at a speed of 26.67 revolutions per minute.

In one embodiment, a drive shaft assembly 900 (FIG. 12) controls the relative rotation of the components of the lavatory module 20. In one embodiment, mechanical drive connections are provided by a flexible belt to efficiently transmit the rotational power between the electric motor and one of the rotatable shafts. In one embodiment, electric motors (not shown) located in the service galley provide the power to drive the relative rotation. Suitable electric motors are commercially available from a variety of sources. In one embodiment, the mechanical drive connections are provided by a set of gears working in tandem as a transmission to efficiently control the rotation of one of the rotatable shafts. In one embodiment the mechanical drive connections are provide by a set of gears working in tandem as a transmission to efficiently control the rotation of all the rotatable shafts.

In one embodiment, the drive shaft assembly 900 comprises a stationary hollow central shaft 940. In one embodiment, the compensator central shaft 810, the relevator central shaft 620, and the lavatory central shaft 720 extend at approximately a 90° angle from a back wall of the counterweight compensator 800 longitudinally toward the passenger bay module 10.

In one embodiment, the central shafts 720, 620 and 810 have a concentrically rotatable orientation around the stationary hollow central shaft 940. In one embodiment, the lavatory central shaft 720 has a greatest diameter. In one embodiment, the relevator central shaft 620 fits concentrically and rotatably within the lavatory central shaft 720. In one embodiment, the compensator central shaft 810 fits concentrically and rotatably within the relevator central shaft 620. In one embodiment, the stationary hollow central shaft 940 fits concentrically within the compensator central shaft 810. In one embodiment, ball bearings are provided in appropriate locations between the shafts in the drive shaft assembly to permit the load bearing relative rotation between the shafts. Suitable ball bearings are available from a variety of commercial sources. In one embodiment, the ball bearings are rolling element bearings, commercially available form RBC Bearings International of Oxford, Conn. In one embodiment, the ball bearings are aerospace plain spherical bearings that have a thin section. In one embodiment, the ball bearings have an unfixed outer and inner ring. In one embodiment, the ball bearings have an inner fixed ring. In one embodiment, the ball bearings have an outer fixed ring.

In one embodiment, a distal end 942 of the stationary hollow central shaft 940 engages with the interior of the cylindrical casing 8. The engagement may be any suitable stationary engagement, for example, a threaded screw engagement, a bayonet engagement, a welded engagement, or other stationary connection. In one embodiment, the distal end 942 of the stationary hollow central shaft 940 comprises a bayonet connector that engages with a receiving bayonet connector at a distal interior surface 820 (FIG. 8) of the cylindrical casing 8. In one embodiment, the distal end 942 of the hollow central shaft 940 extends through and behind the compensator central shaft 810.

Figure 12:
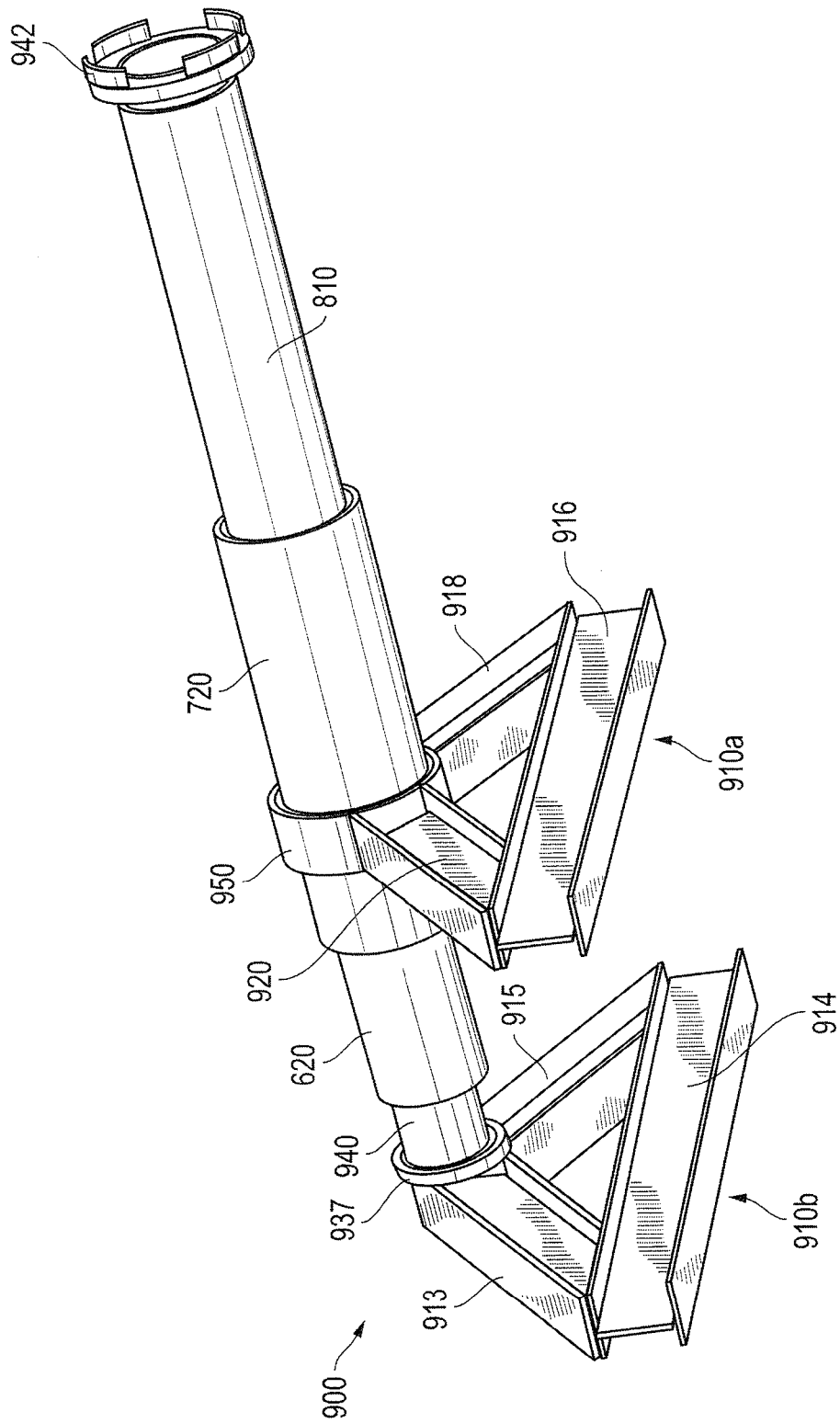
FIG. 12 is a perspective view of a lavatory drive shaft assembly.

In one embodiment, main structure connections 910, 910b are provided to stabilize a proximal end of the drive shaft. The main structure connections 910a, 910b may have a variety of geometrical configurations adapted to provide stability to the lavatory module 20. In the embodiment of FIG. 12, the main structure connections 910a, 910b comprise I-beams welded together to form an isosceles triangular support comprising an apex 937, 950 where the two equal sides 913, 915 and 918, 920 form a 90° angle of an isosceles triangle. In one embodiment, the hypotenuse of the isosceles triangle comprises lower edges 914, 916. In one embodiment, two equal sides 913, 915 and 918, 920 of the isosceles triangles extend from the respective port and starboard ends of the lower edge 914, 916 to the respective apex 937, 950.

In one embodiment, a proximal support 910b and a distal support 910a are provided. Referring to FIG. 12, in one embodiment, a lower edge 916 of the distal support 910b abuts and is welded to the substantially planar floor 50. In one embodiment, the lower edge 914 of the proximal support 910b runs substantially parallel to a distal face of the hatch 80.

Figure 10:
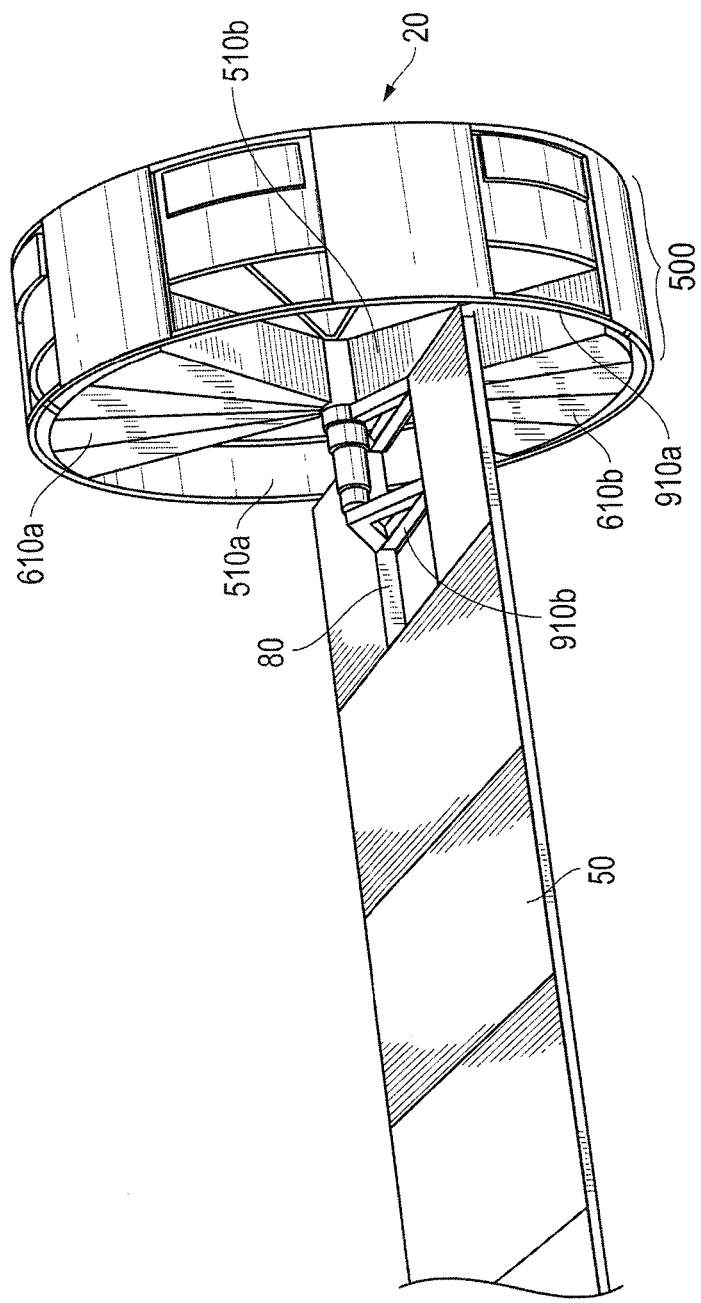
FIG. 10 is a perspective view of the floor of the passenger bay module and the attached lavatory module.

In one embodiment, a proximal end 937 of the stationary hollow central shaft 940 is engaged at an apex of the proximal support 910b (FIGS. 10 and 12). The engagement may be any suitable stationary engagement, for example, a threaded screw engagement, a bayonet engagement, a welded engagement, or other stationary connection. In one embodiment, the engagement at the proximal end 937 is a welded engagement.

The lavatory central shaft 720 is engaged along its length with the distal support 910a (FIGS. 10 and 12). The engagement may be any suitable rotatable engagement. In one embodiment, the lavatory central shaft 720 passes concentrically and rotatably through a cylindrical receiving shaft 950 at the apex 950 of the distal support 910a. In one embodiment, the cylindrical receiving shaft 950 is welded to the apex of the distal main support 910a. In another embodiment, a commercially available modified triangular main support is used. Suitable modified triangular main supports are manufactured from commercially available I-beams. In one embodiment, the hollow central shaft assists in providing air supply to the lavatory compartment by receiving air flow from a duct attached to the air supply plenum in the passenger compartment.

The operation of the lavatory module 20 will now be described. In one embodiment, referring to FIG. 9, a passenger passes into a stationary lavatory entry 420 located at a distal end of the passenger bay module 10. Referring to FIG. 10, the stationary lavatory entry 420 communicates with the relevator 600. In one embodiment, a door is provided between the stationary lavatory entry and the relevator 600. In one embodiment, the door is a retractable door.

In one embodiment, the relevator 600 essentially comprises a rotating elevator that changes the passenger from a frame of reference of a non-rotating passenger bay module 10 to a rotating lavatory component 700. The relevator comprises a plurality of opposed pie-shaped relevator compartments 510a, 510b separated by intervening pie-shaped separators 610a, 610b. In one embodiment, the relevator 500 comprises two opposed pie-shaped relevator compartments 510a, 510b separated by two pie-shaped separators 610a, 610b. The pie-shaped separators 610a, 610b may be made of any suitable material. In one embodiment, the pie shaped separators are made of plastic, aluminum and carbon-epoxy composite. In one embodiment, the pie-shaped separators comprise interior designed and engineered honeycomb, fiberglass, and plastic assemblies commercially available from Composites Unlimited of Irvine, Calif.

The relevator 600 rotates in a counterclockwise direction until a the electric motor operating the relevator receives a signal to permit entry of a passenger. The signal may be a variety of signals. For example, the signal may be generated upon sensing the weight in the entry to the relevator, by verbal command of a passenger, by pressing a button, or upon any number of active or automatic signals. In one embodiment, the passenger presses a button to stop the relevator. In one embodiment, the electrical engine operating rotation of the relevator communicates with the apparatus receiving the signal to stop rotation of the relevator.

In operation, a passenger passes into a stationary entry 420 (FIG. 9), and a signal is generated to stop the relevator 600. The passenger passes into one of the relevator compartments 510a or 510b. The relevator 600 begins to rotate counterclockwise. The counterclockwise rotation of the relevator 600 continues until the relevator is rotating counterclockwise at the same speed as the lavatory component 700. At that point, the passenger is signaled to enter the lavatory component. The signal may be communicated in a variety of ways, including, for example, verbally, using a beep or other noise, or having a port open. In one embodiment, the passenger operates a suitable opening mechanism to open a port (not shown) into a lavatory compartment 710a, 710c.

The lavatory compartments 710a, 710b, 710c may comprise a variety of amenities. With reference to lavatory compartment 710a, each lavatory compartment comprises a sink 740 and a toilet 760. In one embodiment, the sink and toilet are located around the circumference of the lavatory compartment 710a. In this embodiment, the rotation within the lavatory module 20 substantially replicates gravity, thereby assisting in maintaining fluids in the sink and/or toilet. In one embodiment, toilet 760 and the sink 740 are vacuum operated. Suitable vacuum operated toilets and sinks and are commercially available from a variety of sources, including Rogerson Aircraft Equipment Group of Irvine, Calif. In one embodiment, the lavatory compartment 700 comprises one or more water supply tank and one or more waste water tank (not shown). In one embodiment, the water supply tank(s) and the waste water tank(s) are plastic.

In one embodiment, a waste water supply tank is retained in a vacant compartment located between successive lavatory compartments. In one embodiment, a waste water tank is retained in the vacant compartment located between successive lavatory compartments.

In one embodiment, a waste water supply tank is retained in each vacant compartment located between successive lavatory compartments. In one embodiment, a waste water tank is retained in each vacant compartment located between successive lavatory compartments.

In one embodiment, the water supply tank(s) fluidly communicate with one or more sinks in one or more adjacent lavatory compartments. In one embodiment, a water supply tank(s) fluidly communicate with one or more toilets in one or more adjacent lavatory compartments.

In one embodiment, the waste water tank(s) fluidly communicate with one or more sinks in one or more adjacent lavatory compartments. In one embodiment, the waste water tank(s) fluidly communicate with one or more toilets in one more adjacent lavatory compartments.

In one embodiment, the water supply tank(s) are adapted to fluidly communicate with an external source of fresh water, when present. In one embodiment, the waste water tank(s) are adapted to fluidly communicate with an external waste water retention tank, when present. In one embodiment, the water supply tank(s) and the waste water tank(s) are adapted to fluidly communicate with an external source of fresh water and an external waste water retention tank at docking station(s).

When the passenger is finished using the lavatory facilities, the passenger moves back from the lavatory into the relevator. In one embodiment, the passenger operates a signal to notify the relevator to stop. Once the relevator compartment 510a or 510b is located adjacent to the passenger's lavatory compartment 710a, the passenger leaves the lavatory compartment 710a and enters the relevator compartment, for example, 510a. The relevator 600 then stops rotating, positioning the relevator compartment 510a adjacent to the stationary compartment 420. The passenger then exits the relevator 600 and the lavatory module 20.

In one embodiment, the counterweight compensator 800 comprises a round planar backing 814 and a circumferential wall 815 extending from the backing toward the passenger bay module to form a cup structure. In one embodiment, the wall 815 has a width, indicated by the arrow sufficient upon concentric engagement of the shafts 810, 720, and 620 to surround the lavatory module 700 and the relevator 600 around their circumference. In one embodiment, the wall has a width of 2.0 inch.

In one embodiment, the backing 814 and wall 815 of the counterweight compensator 800 may be constructed of a variety of materials. In one embodiment, backing and wall are constructed of alternating panels of carbon-epoxy composite. In one embodiment, the backing and wall are constructed of carbon-epoxy composite alternating with aluminum connectors. In one embodiment, the counterweight compensator is adapted to adjust components to compensate for inertia changes in the lavatory and relevator modules. In one embodiment, the counterweight compensator compensates for inertia along one axis. In one embodiment, the counterweight compensator compensates for inertia along two axes.

In one embodiment, the toilet is a vacuum flush toilet. Vacuum flush toilets are commonly used in passenger airplanes and do not require training for use. Suitable vacuum flush toilets are commercially available.

Life Support Systems and Integration

In one embodiment, the cylindrical casing 8 is provided with an Environmental Control and Life Support System (ECLSS). The ECLSS monitors and modulates a variety of parameters. In one embodiment, the ECLSS monitors one or more of the following parameters: cabin pressure; breathable oxygen levels; humidity levels; odors; and exhaled gases. In one embodiment, the ECLSS monitors all of the foregoing parameters. In one embodiment, exhaled gases monitored and modulated by the ECLSS include $CO_2$ levels. In one embodiment the ECLSS monitors and modulates nitrogen levels. In one embodiment, referring to FIG. 8, the cylindrical casing 8 comprises one or more air ports 310a, 310b.

In one embodiment, the ECLSS units 402 are substantially the same as the Space Shuttle life support system units. Paragon Space Development Corporation Completes All Development Milestones on the NASA Commercial Crew development Program, Press Release, Ex. D.

Figure 9:
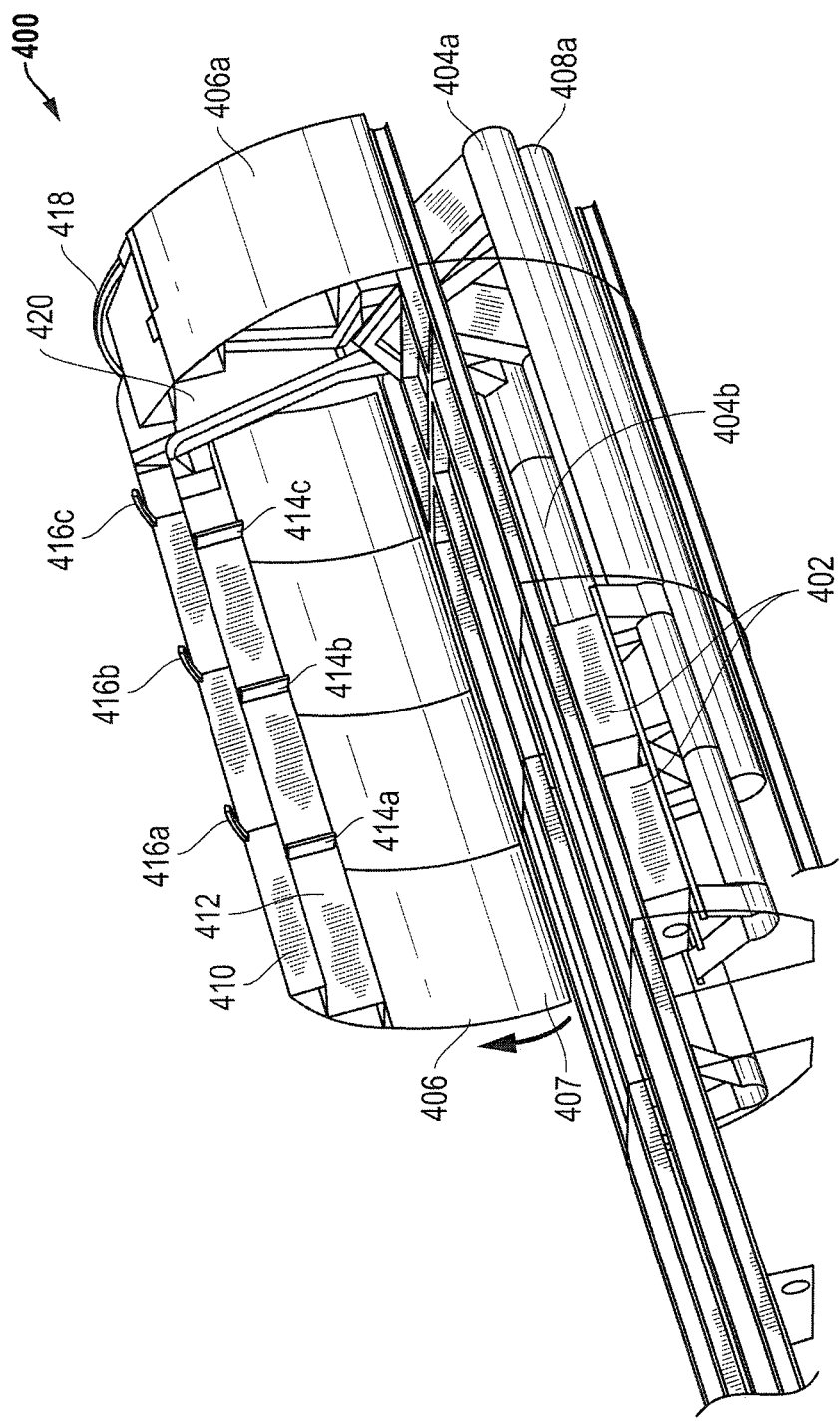
FIG. 9 is a cut away view of a portion of the distal end including the Environmental Control and Life Support System components and a stationary lavatory entrance zone.

Referring to FIG. 9, in one embodiment, the cylindrical casing comprises from 1 to 8 ECLSS units 402. In one embodiment, the cylindrical casing comprises from 6 to about 8 units ECLSS units. In one embodiment, the cylindrical casing comprises 8 ECLSS units. In one embodiment, the ECLSS units are commercially available from Paragon Systems Inc., Tucson, Ariz.

In the embodiment of FIG. 9, air supply and return headers are provided. The air supply and air return headers are ducts made of any suitable material. The ducts may have a variety of geometric structure, such as rectangular, triangular, cylindrical, and the like. In one embodiment, an air supply header and an air return header is provided on the port and starboard side in the service galley module.

In one embodiment, referring to FIG. 9, a port header air return 404a and a port header air supply 408a are provided. In one embodiment, starboard header air supply (not shown) and a starboard header air return 404b are provided. The port and starboard air return headers 404a, 404b communicate with the ECLSS units. The ECLSS units purify and humidify the air, as needed. The purified humidified air is then circulated within the cylindrical capsule 8 via the port air supply header 408a and the starboard air supply header (not shown). In one embodiment, the port and starboard air supply and/or air return headers are provided with shut off valves. The shut off valves may be actuated in an emergency to shut off air flow from the service galley 30 to the passenger bay module 10.

In one embodiment, referring to FIG. 9, a port thermal return wall 406a (cutaway) and a starboard thermal return wall 406 are provided. In one embodiment, used air from the passenger bay module passes under the thermal return walls 406, 406a between a lower end 407 of the thermal return walls and the substantially planar floor 50 (not shown).

At an upper end, the thermal return walls comprise a passenger bay air circulation duct 412. In one embodiment, air passes from the port air supply header 408a and the starboard air supply header (not shown) through a proximal end of the passenger bay air circulation duct 412 and into the passenger bay module 10 through one or more openings in the passenger bay air circulation duct 412. In the embodiment depicted in FIG. 9, the air passes from the passenger bay air circulation duct 412 through one or more openings 414a, 414b, 414c and into the passenger bay module 10. The air circulates through the passenger bay module and under the thermal return walls 406, 406a to the port air return header (not shown) and/or the starboard air return header 404a. The air then passes to the ECCLS units, where it is purified and recirculated via the port air supply header 404a and the starboard air supply header (not shown).

In one embodiment, the passenger bay air supply duct also communicates with one or more sleeper air supply duct 410. In one embodiment, one or more sleeper cabin air supply ducts 416a-c extend from the sleeper air supply duct 410 directly to the sleeper cabins 202. In one embodiment, one sleeper air supply duct 410 is supplied to each sleeper cabin. In this embodiment, the air from the sleeper cabins is returned to the passenger bay module 10.

In one embodiment, the ECLSS maintains a pressure of about 14.7 psi and an air content of about 80% nitrogen/20% oxygen. In one embodiment, the air quality is maintained by passing the air in the closed system through canisters comprising metal hydroxide on a filter. The metal hydroxide may be a variety of materials including, for example, silver oxide, sodium oxide, potassium oxide, magnesium oxide, calcium oxide, or zinc oxide. In one embodiment, metal hydroxide is lithium hydroxide. In one embodiment, the filter has a pore size of from about 100 to about 500 microns. In one embodiment, the filter has a pore size of from about 200 to about 400 microns. In one embodiment, the filter has a pore size of about 300-microns. In one embodiment, the filter has a pore size of 300.

In one embodiment, the ECLSS performs from about 5 to about 15 air changes per hour. In one embodiment, the ECLSS performs from about 6 to about 14 air changes per hour. In one embodiment, the ECLSS performs from about 7 to about 13 air changes per hour. In one embodiment, the ECLSS performs from about 8 to about 14 air changes per hour. In one embodiment, the ECLSS performs from about 8 to about 10 air changes per hour. In one embodiment, the ECLSS performs approximately 8.5 air changes per hour. In one embodiment, the ECLSS performs 8.5 air changes per hour.

In one embodiment, the ECLSS provides air temperature control. In one embodiment, the ECLSS comprises a heat exchanger comprising plurality of independent loops effective to heat and/or cool the contained air. Suitable heat exchangers are commercially available from a variety of sources. In one embodiment, the heat exchanger is a component of Commercial Crew Transport-Air Revitalization System (CCT-ARS), commercially available from Paragon Systems of Tucson, Ariz.

In one embodiment, the ECLSS provides air humidity control. In one embodiment, the ECLSS comprises a heat exchanger slurper. The heat exchanger slurper adds moisture to or removes moisture from the air, as needed. Suitable heat exchanger slurpers are commercially available from a variety of sources. In one embodiment, the heat exchanger slurper is a component of CCT-ARS, commercially available from Paragon Systems of Tucson, Ariz.

In one embodiment, the ECLSS provides odor control. In one embodiment, the ECLSS comprises a charcoal filter. Suitable charcoal filters are commercially available from a variety of sources. In one embodiment, the charcoal filter is a component of CCT-ARS, commercially available from Paragon Systems of Tucson, Ariz.

In one embodiment, the cylindrical casing 8 communicates with an internal oxygen supply tank (not shown). In one embodiment, the cylindrical casing communicates with an oxygen supply tank external to the space shuttle. In one embodiment, the cylindrical casing communicates with the oxygen supply for the crew of the SSP Orbital Vehicle.

In one embodiment, the cylindrical casing 8 communicates with the Atmospheric Revitalization System (ARS) of the SSP Orbital Vehicle.

In one embodiment, the life support system communicates with an oxygen supply tank internal to the passenger bay module. In one embodiment, the cylindrical casing 8 communicates with the Atmospheric Revitalization System (ARS) of the SSP Orbital Vehicle as specified by the CORE Section 6.3.1 as a typical habitable Space Shuttle module.

Thermal Control

In one embodiment, a habitable temperature is maintained in the passenger bay module using any suitable thermal control system. In one embodiment, the thermal control system is a passive thermal control system. In one embodiment, heat or coolant is applied, as needed, at the interior and at the exterior of the passenger bay module by interfacing with the Space Shuttle Payload Active Cooling Kit (PACK) by flexible and rigid tubing segments as specified by CORE Section 3.3.5.2.1. In one embodiment, the passenger bay module will be separately insulated. In one embodiment, the interior of the passenger bay module is provided with insulation. Suitable insulation includes those described above. In on embodiment, the insulation modulates heat transfer. In one embodiment, the insulation provides acoustical damping.

Various Specifications

In one embodiment, the cylindrical casing 8 and a SPP orbital vehicle comprising a payload bay 7 (FIG. 1) loaded with the cylindrical cylinder 8. In one embodiment, the cylindrical cylinder meets Program Description and Requirements Baseline, Program Definition and Requirements, NSS 07700, Volume I, Revision G, (Dec. 17, 1997) (copy provided, incorporated herein by reference) (hereafter, the "Space Shuttle Program Base Requirements").

In one embodiment, all welds in the cylindrical casing pass x-ray tests and level three fluorescent dye penetration tests, as described in the Space Shuttle Program Base Requirements. In one embodiment, the cylindrical cylinder 8 and a SPP orbital vehicle 2 comprising a payload bay loaded with the cylindrical casing 8 meet all of the structural, vibration, thermal, life support, and power systems specifications, as described in the Space Shuttle Program Base Requirements.

In one embodiment, the total weight of the cylindrical cylinder 8 and a SPP orbital vehicle 2 comprising a payload bay loaded with the cylindrical casing 8, including passengers and cargo, meets the weight specifications of the Space Shuttle Program Base Requirements. In one embodiment, the dry mass of the cylindrical cylinder 8 and a SPP orbital vehicle 2 comprising a payload bay loaded with the cylindrical casing 8, including passengers and cargo, meets the dry mass weight constraints of the Space Shuttle Program Base Requirements.

Example 1

A mass estimate was prepared for a cylindrical casing having the foregoing construction. The results are given in FIG. 13.

Example 2

Evaluation of Commercial Feasibility

In the past, orbital flights have been financed by governments, including the government of the United States of America. Scheduling and implementation of expensive SSPOV missions previously was handled by the National Aeronautics and Space Administration (NASA). Typically, a launch date for an SSPOV mission was budgeted and scheduled well in advance by NASA and funded with tax dollars. The estimated fixed cost to launch, orbit, and land a Space Shuttle Program Orbital Vehicle (SSPOV) is $2 billion. (FIG. 14 is a detailed Table reflecting NASA'S 2009 Fiscal Year Budget Estimate.) Accordingly, in order to successfully reuse a SSPOV to provide private orbital flights at a profit, the average income from operating each SSPOV flight would have to be at least $2 billion. With the cost of a Soyuz ride to the ISS up to $65 million per seat, some simple math shows charging that price for 44 passengers could generate $2.86 billion per Shuttle launch. The issue that prevents realization of this simple scenario is that the market demand does not exist for 44 seats at $65 million per seat. Identifying that the market is in the elastic range shows the path to a successful business model: a plan that lowers the price per seat and attracts "many" more passengers, thereby generating more total revenue.

It may seem counter intuitive but lowering the price increases revenue and profit simply because the market demand increases at a faster rate than the price goes down. The economic measure of this relationship is price elasticity of demand and the market at $65 million per seat is in the relative elastic region. An analysis was made to determine how the passenger seat prices could be reduced to below $10 million per seat and still generate sufficient income to cover operation costs for missions. Matching the launch costs of the SSP with the elastic demand determined the breakeven point for commercial SSP Orbital Vehicle flights.

The operating costs were divided into two categories (1) fixed costs and (2) variable costs. The fixed costs were fundamental operational costs of operating a shuttle program and were assumed to remain relatively constant regardless of how may launches occurred. The variable costs were treated as a direct function of the number of Space Shuttle launches per year. The sum of these costs per year divided by 10 provided a 'per Shuttle launch variable cost.'

The following "FLIGHT HARDWARE" items were identified as variable costs, as shown in Table 2:

TABLE 2

| Variable Space Shuttle Launch Costs | | |
|---|---|---|
| Variable Costs ($ millions) | NASA: FY08-FY10 | SPACELINE AND NASA PER SHUTTLE LAUNCH* |
| External Tank | 736.0 | 73.6 |
| Reusable Solid Rocket Motors | 785.5 | 78.6 |
| Space Shuttle Main Engine | 611.8 | 61.2 |
| Solid Rocket Boosters | 389.1 | 38.9 |
| Total Variable Launch Costs | | 252.3 |

*Averaged over NASA scheduled 10 Shuttle launches during FY08-FY10.

In order to lower the passenger seat cost, it was assumed that the SSP Orbital Vehicle would launch as many times per year as possible. A launch facility capable of not only launching to easterly azimuths but also to polar orbits was chosen, thereby doubling the Shuttle launch market. A total of 18 launches per year were assumed, 9 to easterly azimuths (as NASA achieved in 1985) and 9 to polar orbits. It was also assumed that 10 of the launches would be passenger bay launches and 8 of the launches would be cargo launches. It was assumed that the 10 passenger bay flights were repeated on a yearly basis, thereby reducing the work load for mission planning. In this scenario, after the first year of full operation, the only new mission planning would involve the cargo missions.

Figure 18:
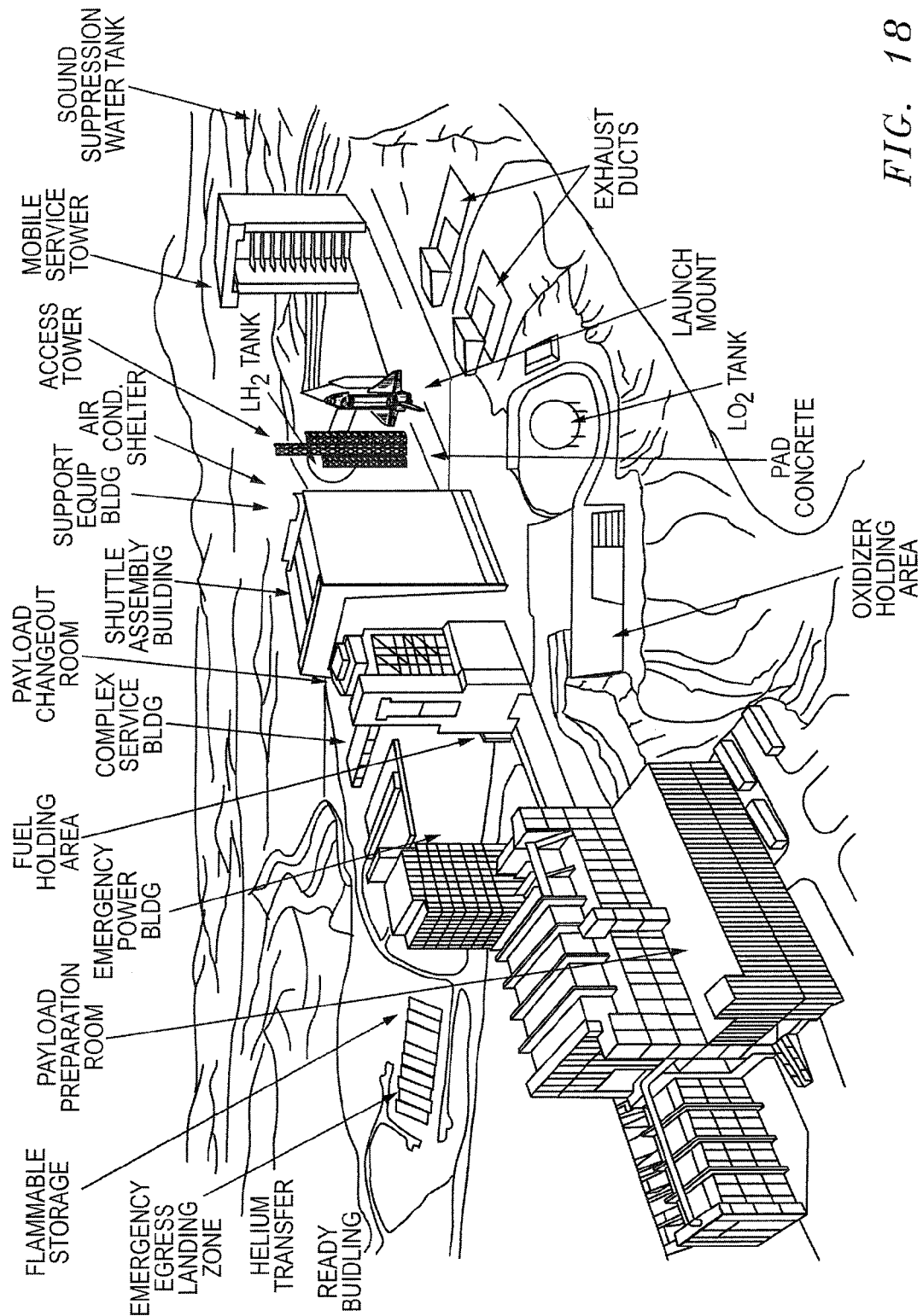
FIG. 18 is an illustration of a Shuttle Launch Complex-6 launch pad.

The NASA FY09 Budget estimate appears in FIG. 14. A launch and landing reduction in cost of 50% was assumed, based on Applicant's knowledge and proven background of reducing NASA's software project costs by 50%, on cost reductions from relocating the launch and landing facility, and based on the following:

A. Flight and Ground operations—Launch and Landing operation cost will be reduced by 50% with the following changes:
  i. Shuttle Launch Complex-6 (SLC-6) launch pad, on which the shuttle stack is built on the launch pad and the surrounding buildings are rolled away on rail line tracks (illustrated in FIG. 18), which either would be leased from or rebuilt with the assistance of a government agency on or around the former Matagorda Air Force Base and Bombing Range (Texas Coast line).
  ii. Autopilot primary mode landing with human component acting as a backup system.
  iii. Consolidated launch, landing and mission control operations.
  iv. Just-in-time (JIT) manufacturing and commercial enterprise approach to operations.

B. Flight Hardware—Orbiter processing operation cost reduction by 50% with the following changes:
  i. Streamlining the Shuttle Orbiter Processing using 24 hour operations and 3 day missions to provide greater access to orbiters.
  ii. SLC-6 processing with payload change-out room access to payloads
  iii. Just-In-Time (JIT) manufacturing and commercial enterprise approach to operations.

C. Program Integration—Flight Software operation cost reduction by 50% with the following changes:
  i. Addition of Spacedesign Software expertise in commercializing NASA software development and maintenance with a proven 50% cost reduction.
  ii. Modernize source control management and tracking.
  iii. Modernize software development to focus on productivity and fewer design iterations.

Based on the foregoing, the following cost reductions in three fixed costs were assumed:

| Fixed Costs ($ millions) | NASA FY08-10 AVG | 50% Cost Reduction |
|---|---|---|
| Launch and Landing | 706.1 | 353.0 |
| Orbiter | 534.1 | 267.0 |
| Flight Software | 106.9 | 53.5 |
| Total Reduction in Fixed Costs | 1347.1 | 673.5 |

Using the yearly average NASA budget as a baseline, the Budget Estimate in FIG. 16 was made, including Reduced Fixed Costs and Variable Launch Costs for 18 Flights. The total cost for 18 flights with stated cost reductions (or no cost reductions) was calculated as $5,915.6 million (or $6,589.2 million), making each shuttle launch $328.6 million (or $366.0 million).

Assuming a 50% probability of cost reduction success, the 'expected' mission cost was calculated using a probability weighting, as follows.

$$\text{Expected Mission Cost} = (50\% * \$328.6 \text{ mil.} + 50\% * \$366.0 \text{ mil.})$$

$$= \$347.3 \text{ million}$$

The Expected Mission Cost, $347,300,000, was divided by 44 seats to determine a break-even per seat cost of $7,893,181.82.

Figure 15:
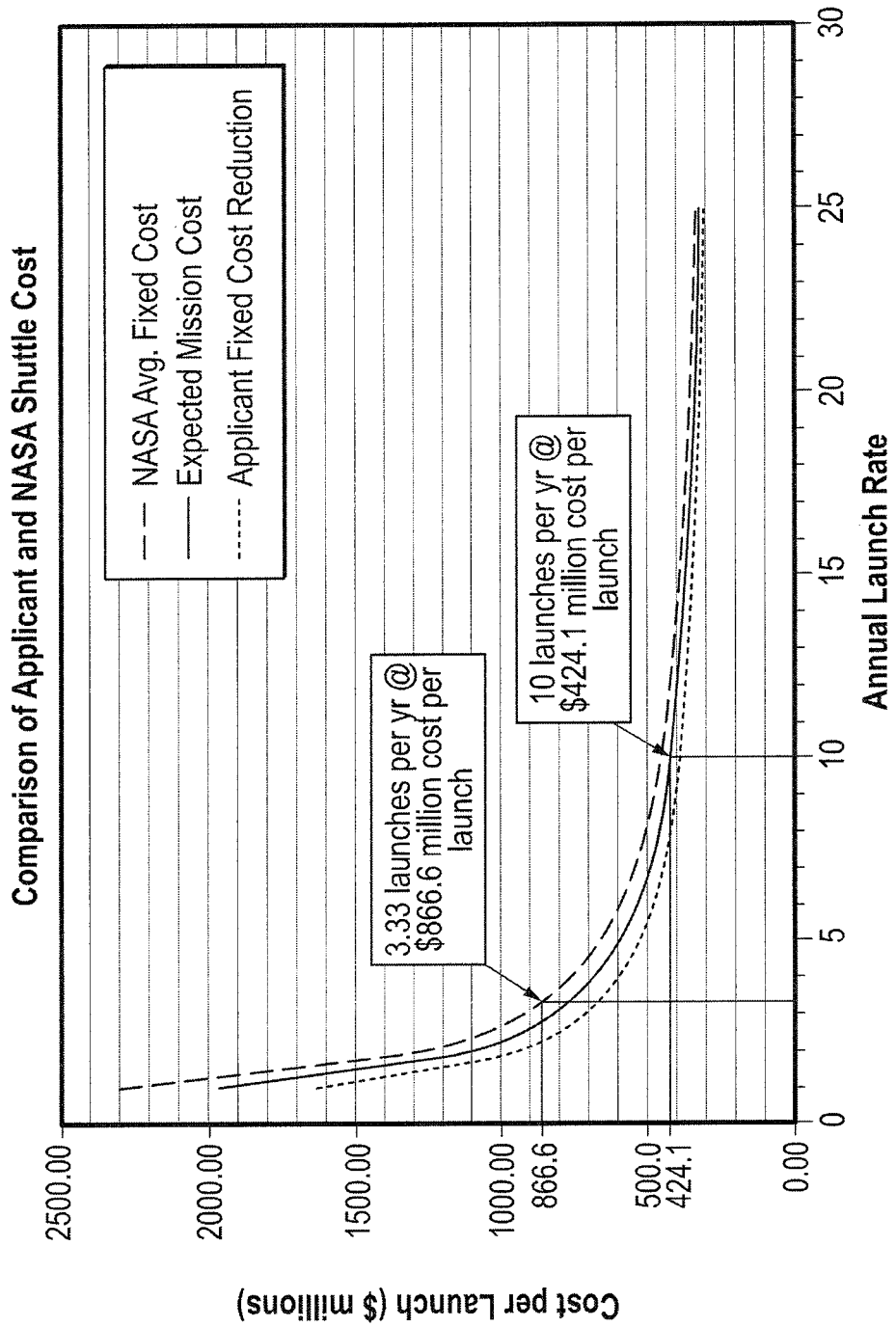
FIG. 15 is a graph of the known fixed cost per launch of the Space Shuttle Vehicle versus the annual launch rate assuming 18 launches per year.
Figure 17:
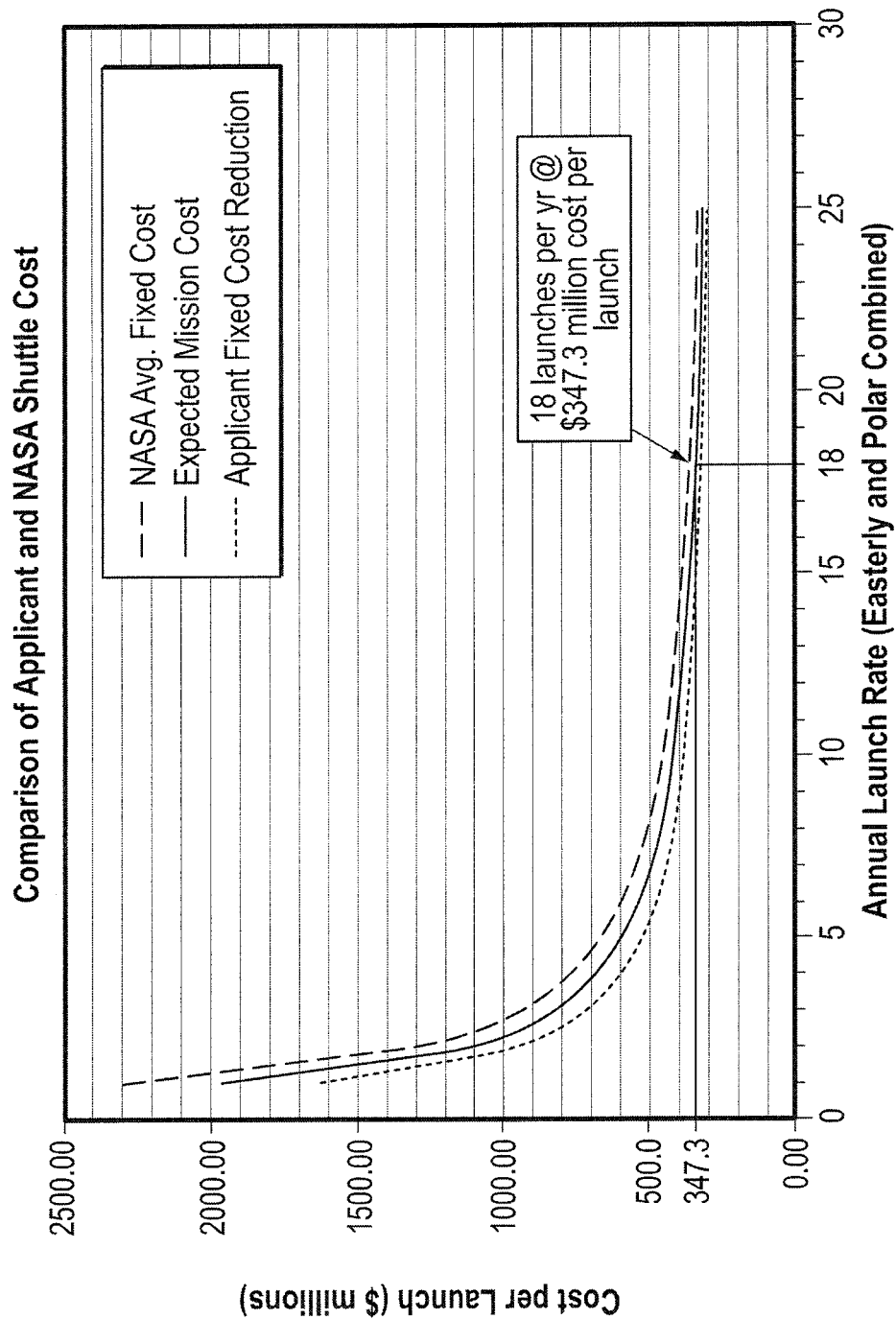
FIG. 17 is a graph of the fixed cost per launch of the Space Shuttle Orbital Vehicle versus the annual launch rate assuming 10 launches per year and based on the assumptions in FIG. 16.

FIG. 15 is a graph of the Cost per Launch verses Annual Launch Rate. Three curves are shown in FIG. 15:
  a curve representing the "NASA Average Fixed Cost" scenario from above,
  a curve reflecting a goal reduction in fixed costs of 50%; and,
  a curve reflecting an "Expected Mission Cost" with a more obtainable 25% reduction in fixed cost FIG. 15 shows that, as the Annual Launch Rate increases, the Cost per Mission decreases (which is directly tied to the cost per seat). Accordingly, commercial SSP Orbital Vehicle flights should safely launch as many times a year as possible.

In order to include a profit, it was assumed that a fully loaded Passenger Bay (44 passengers) should generate base revenue of $369,040,980 (5.89% profit margin) or total revenue with fees of $388,840,980 (10.68% profit margin) per shuttle flight. In these scenarios, it is possible to offer discounts to the life-support fee in order to provide purchase incentives to potential passengers. It was calculated that the number of passenger seat purchases required to "break-even" was 41.41 for the base revenue case and 39.30 for the total revenue with fees case. It was also determined that a passenger load factor of 88% or more would be needed. Based on the foregoing, it was determined that each passenger seat would be sold at $8,387,295.00 (plus $450,000 life-support fee).

Lowering the per seat cost to below $10 million, expanded the target market beyond solely ultra-wealthy businessmen, the only consumers to date who have purchased luxury space travel. It was assumed that ultra-wealthy businessmen also could afford to bring family or friends with them, which will grow the market space. The target market also was assumed to be expanded to include high-paid professional athletes, from football, baseball, basketball and golf, high-paid Wall Street fund managers, high paid corporate CEO's, and high-paid entertainers, just to name a few.

Example 3

An evaluation was performed to determine whether available space in the SSP Orbital Vehicle payload bay could be more efficiently allocated to reduce the number of flights required to break even and, preferably to profit. Again, matching the launch costs of the SSP with the elastic demand determined the breakeven point for commercial SSP Orbital Vehicle flights.

The costs for operating commercial SSP Orbital Vehicle flights were based on existing NASA figures. Price quotes for from vendors were obtained during the base period. The FY2008-2010 NASA costs are shown in the FIG. 14. The total NASA cost for 10 missions was calculated to be $8,665.5 million. Dividing the total NASA cost by a total of 10 missions resulted in a NASA cost of $866.6 million per flight.

Fixed and variable costs were deduced as $1,347.1 million and $252.3 million, respectively, calculated by isolating the variable line item costs "External Tank", "Reusable Solid Rocket Motors", "Space Shuttle Main Engines" and "Solid Rocket Boosters". FIG. 15 is a graph of the Cost per Launch verses Annual Launch Rate assuming 10 flights with the following three curves:
  a curve representing the "NASA Average Fixed Cost" scenario from above, a curve reflecting a goal reduction in fixed costs of 50%; and, a curve reflecting an "Expected Mission Cost" with a more obtainable 25% reduction in fixed cost FIG. 15 shows that, as the Annual Launch Rate increases, the Cost per Mission decreases (which is directly tied to the cost per seat). Changing the Space Shuttle on-orbit mission duration to three days improved the efficiency enough to fly 10 missions per year (1 more than the 9 flights in 1985). Another amenity was added to further lower the seat cost and drive up demand, thereby increasing revenue. The added amenity was five (5) private sleeper cabins. This provided an Expected Mission Cost of $424.1 million per flight.

It was determined that the breakeven point of $424.2 million per flight could be achieved by operating ten (10) flights for 3 days each, annually, if 39 or more floor seats were sold at $8,837,295 each (250 lb. Limit), five (5) sleeper cabins were sold at $7,069,836 each, each passenger paid a separate life support fee of $450,000. Any cargo or body weight exceeding 250 lb. per passenger will be priced at $999/lb. It was determined that, with the foregoing fees and luxury travel, a commercial SSP Orbital Vehicle program can generate up to $4.24 billion dollars in revenue on an annual basis. If the market does not develop as expected, cargo flights may be offered. Cargo flights would increase revenue by launching cargo, space station modules, and/or launching satellites.

Persons of ordinary skill in the art will recognize that many modifications may be made to the foregoing description. The embodiments described herein are meant to be illustrative only and should not be taken as limiting the invention, which will be defined in the claims.

I claim:

1. A method of flying an orbital mission using a space vehicle, the method comprising:

providing the space vehicle operable at a fixed program cost and a variable per orbital mission cost, the space vehicle comprising a cylindrical casing comprising a passenger bay module, the cylindrical casing comprising a proximal end comprising a connection system adapted to connect to an orbital vehicle and a distal end;

providing the space vehicle with an adapted cylindrical casing wherein the distal end comprises a lavatory module that is physically separated from and rotatably positioned adjacent to the passenger bay module;

providing the lavatory module with an entry structure comprising a relevator adapted to transition an object between the passenger bay module and the lavatory module, the relevator being separately rotatable with respect to the passenger bay module and the lavatory module, the connection system comprising a port adapted for exiting the space vehicle, the lavatory module comprising rotatable components comprising the lavatory component, the rotatable components being adapted to form the entry structure;

adapting relative rotation of the rotatable components to produce sufficient centrifugal force in the lavatory component to replicate gravity; and, flying an orbital mission using the space vehicle comprising the adapted cylindrical casing.

2. The method of claim 1 further comprising adapting the relevator to receive a rotate signal and a stop signal;

providing as the relevator a plurality of concentric substantially solid structures separated by a plurality of concentric compartments all concentrically positioned around a relevator central shaft extending along a central axis, one or more of the concentric compartments comprising an entry from the passenger bay module in a stop position and an entry into the lavatory module in a rotating position.

3. The method of claim 2 further comprising operating a plurality of the orbital missions per year, and varying one or more parameter(s) selected from the group consisting of an average annual number of orbital missions, an average annual length per orbital mission, an average annual number of passenger seats sold per orbital mission, an average annual passenger seat price, an average annual life support fee per passenger, optional amenity fees, any other fees, and combinations thereof.

4. The method of claim 3 comprising providing 39 or more as the average annual number of passenger seats per orbital mission.

5. The method of claim 3 comprising:

charging an average annual passenger seat price of $10 million or less.

6. The method of claim 5 wherein:

the average annual number of orbital missions is ten (10) or more; and, the average annual length per orbital mission is three (3) days.

7. The method of claim 6 wherein the space vehicle is a Space Shuttle Orbital Vehicle.

8. The method of claim 3 wherein each of the plurality of the orbital missions comprises:

securing the passengers in seats in the passenger bay module;

launching the space vehicle from a take-off site on earth while the passengers are secured in the passenger bay module;

transporting the space vehicle and the passengers in the passenger bay module to a location in space;

maintaining safe and habitable conditions for the passengers in the passenger bay module during each mission;

transporting the space vehicle and the passengers in the passenger bay module back to earth; and, landing the space vehicle at a landing location on earth.

9. The method of claim 8 wherein the location in space comprises the International Space Station (ISS).

10. The method of claim 8 wherein the adapted cylindrical casing provides and maintains habitable conditions for up to forty four passengers during a mission comprising traveling from earth to space and back to earth.

11. The method of claim 1 wherein the space vehicle is a Space Shuttle Orbital Vehicle.

12. The method of claim 1 wherein the adapted cylindrical casing provides and maintains habitable conditions for up to forty four passengers during a mission comprising traveling from earth to space and back to earth.

13. A method of flying orbital missions using a space vehicle, the method comprising:

providing the space vehicle operable at a fixed program cost and a variable per orbital mission cost, the space vehicle comprising a cylindrical casing comprising a passenger bay module, the cylindrical casing comprising a proximal end comprising connection system adapted to connect to an orbital vehicle and a distal end;

providing the space vehicle with an adapted cylindrical casing wherein the distal end comprises a lavatory module that is physically separated from and rotatably positioned adjacent to the passenger bay module;

providing the lavatory module with an entry structure comprising a relevator adapted to transition an object between the passenger bay module and the lavatory module, the relevator being separately rotatable with respect to the passenger bay module and the lavatory module, the connection system comprising a port adapted for exiting the space vehicle, the lavatory module comprising rotatable components comprising the lavatory component, the rotatable components being adapted to form the entry structure;

adapting the relevator to receive a rotate signal and a stop signal;

providing as the relevator a plurality of concentric substantially solid structures separated by a plurality of concentric compartments all concentrically positioned around a relevator central shaft extending along a central axis, one or more of the concentric compartments comprising an entry from the passenger bay module in a stop position and an entry into the lavatory module in a rotating position;

adapting relative rotation of the rotatable components to produce sufficient centrifugal force in the lavatory component to replicate gravity;

providing the passenger bay module with one or more sleeper cabins; and, flying a plurality of orbital missions using the space vehicle comprising the adapted cylindrical casing.

14. The method of claim 13 further comprising operating a plurality of the orbital missions per year, and varying one or more parameter(s) selected from the group consisting of an average annual number of orbital missions, an average annual length per orbital mission, an average annual number of passenger seats sold per orbital mission, an average annual passenger seat price, an average annual life support fee per passenger, optional amenity fees, any other fees, and combinations thereof.

15. The method of claim 14 comprising charging an average annual sleeper cabin price of $10 million or less.

16. The method of claim 14 comprising:
charging an average annual passenger seat price of from $7 million to $10 million;
providing the space vehicle with five (5) or more of the sleeper cabins;
charging an average annual sleeper cabin price of from $6 million to $10 million;
charging an average annual life support fee per passenger per orbital mission of $450,000; and,
varying the price of any optional services and amenities.

17. The method of claim 16 comprising charging an annual average life support fee per passenger of $350,000 or more.

18. The method of claim 17 wherein the any other fees comprise an average excess weight fee per passenger and cargo for every pound over 250 lb. per passenger.

19. The method of claim 18 comprising charging $999 per pound as the average excess weight fee.

20. The method of claim 18 wherein the any other fees comprise an average return cargo fee per pound for transporting cargo back to earth.

21. The method of claim 20 comprising charging $99 per pound as the average return cargo fee.

22. The method of claim 16 comprising charging an annual average life support fee per passenger of $450,000 or more.

23. The method of claim 16 wherein each mission comprises:
securing the passengers in seats in the passenger bay module;
launching the space vehicle from a take-off site on earth while the passengers are secured in the passenger bay module;
transporting the space vehicle and the passengers in the passenger bay module to a location in space;
maintaining safe and habitable conditions for the passengers in the passenger bay module during each mission;
transporting the space vehicle and the passengers in the passenger bay module back to earth; and,
landing the space vehicle at a landing location on earth.

24. The method of claim 23 wherein the adapted cylindrical casing provides and maintains habitable conditions for up to forty four passengers during a mission comprising traveling from earth to space and back to earth.

25. The method of claim 16 wherein the adapted cylindrical casing provides and maintains habitable conditions for up to forty four passengers during a mission comprising traveling from earth to space and back to earth.

26. A method of flying orbital missions using a space vehicle, the method comprising:
providing the space vehicle operable at a fixed program cost and a variable per orbital mission cost, the space vehicle comprising a cylindrical casing comprising a passenger bay module, the cylindrical casing comprising a proximal end comprising connection system adapted to connect to an orbital vehicle and a distal end;
providing the space vehicle with an adapted cylindrical casing wherein the distal end comprises a lavatory module that is physically separated from and rotatably positioned adjacent to the passenger bay module;
providing the lavatory module with an entry structure comprising a relevator adapted to transition an object between the passenger bay module and the lavatory module, the relevator being separately rotatable with respect to the passenger bay module and the lavatory module, the connection system comprising a port adapted for exiting the space vehicle, the lavatory module comprising rotatable components comprising the lavatory component, the rotatable components being adapted to form the entry structure;
adapting the relevator to receive a rotate signal and a stop signal;
providing as the relevator a plurality of concentric substantially solid structures separated by a plurality of concentric compartments all concentrically positioned around a relevator central shaft extending along a central axis, one or more of the concentric compartments comprising an entry from the passenger bay module in a stop position and an entry into the lavatory module in a rotating position;
adapting relative rotation of the rotatable components to produce sufficient centrifugal force in the lavatory component to replicate gravity;
providing the passenger bay module with one or more sleeper cabins; and,
flying a plurality of orbital missions using the space vehicle comprising the adapted cylindrical casing, wherein each mission comprises:
securing the passengers in seats in the passenger bay module;
launching the space vehicle from a take-off site on earth while the passengers are secured in the passenger bay module;
transporting the space vehicle and the passengers in the passenger bay module to a location in space;

maintaining safe and habitable conditions for the passengers in the passenger bay module during each mission;

transporting the space vehicle and the passengers in the passenger bay module back to earth; and, landing the space vehicle at a landing location on earth;

varying one or more parameter(s) selected from the group consisting of an average annual number of orbital missions, an average annual length per orbital mission, an average annual number of passenger seats sold per orbital mission, an average annual passenger seat price, an average annual life support fee per passenger, optional amenity fees, any other fees, and combinations thereof.

27. The method of claim 26 comprising:

charging $8 million or more as the average annual passenger seat price; and, charging $7 million or more as an average annual sleeper cabin price.

28. The method of claim 27 comprising charging $350,000 or more as an annual average life support fee per passenger.

29. The method of claim 28 wherein the any other fees comprise an average excess weight fee per passenger and cargo for every pound over 250 lb. per passenger.

30. The method of claim 29 comprising charging $999 per pound as the average excess weight fee.

31. The method of claim 28 wherein the any other fees comprise an average return cargo fee per pound for transporting cargo back to earth.

32. The method of claim 31 comprising charging $99 per pound as the average return cargo fee.

33. The method of claim 31 wherein the space vehicle is a Space Shuttle Orbital Vehicle.

34. The method of claim 31 wherein the varying one or more parameter(s) comprises an average Passenger load factor of 88% or more calculated over three or more consecutive fiscal years of operating the plurality of the orbital missions per year.

35. The method of claim 34 wherein the adapted cylindrical casing provides and maintains habitable conditions for up to forty four passengers during the plurality of orbital missions.

36. The method of claim 27 comprising charging $450,000 or more as an annual average life support fee per passenger.

37. The method of claim 26 comprising:

charging $8,837,294 as the average annual passenger seat price; and, charging $7,069,836 as the average annual sleeper cabin price.

38. The method of claim 26 wherein the space vehicle is a Space Shuttle Orbital Vehicle.

39. The method of claim 26 wherein the varying one or more parameter(s) comprises an average Passenger load factor of 88% or more calculated over three or more consecutive fiscal years of operating the plurality of the orbital missions per year.

40. The method of claim 39 wherein the adapted cylindrical casing provides and maintains habitable conditions for up to forty four passengers during the plurality of orbital missions.

41. The method of claim 26 wherein the adapted cylindrical casing provides and maintains habitable conditions for up to forty four passengers during the plurality of orbital missions.

* * * * *